US012670877B1

(12) United States Patent
Liu

(10) Patent No.: US 12,670,877 B1
(45) Date of Patent: Jun. 30, 2026

(54) SWITCH CIRCUIT, DISPLAY DRIVING CIRCUIT, DISPLAY SYSTEM, AND CIRCUIT OPERATION METHOD THEREOF

(71) Applicant: FITIPOWER INTEGRATED TECHNOLOGY INC., Hsinchu City (TW)

(72) Inventor: Ting-Hao Liu, Hsinchu City (TW)

(73) Assignee: FITIPOWER INTEGRATED TECHNOLOGY INC., Hsinchu City (TW)

(*) Notice: Subject to any disclaimer, the term of this patent is extended or adjusted under 35 U.S.C. 154(b) by 0 days.

(21) Appl. No.: 19/264,847

(22) Filed: Jul. 9, 2025

(30) Foreign Application Priority Data

May 22, 2025 (TW) ................................ 114119196

(51) Int. Cl.
*G09G 3/34* (2006.01)

(52) U.S. Cl.
CPC ..... *G09G 3/344* (2013.01); *G09G 2310/0267* (2013.01); *G09G 2310/0275* (2013.01)

(58) Field of Classification Search
CPC .......... G09G 3/32; G09G 3/36; G09G 3/3648; G09G 3/3688; G09G 3/20; G09G 3/3426; G09G 3/3406; G09G 3/3611; G09G 3/3677; G09G 3/2011; G09G 3/2074; G09G 3/2942; G09G 3/296; G09G 3/2965; G09G 3/298; G09G 3/34; G09G 3/342; G09G 3/3629; G09G 3/364; G09G 3/3681; G09G 3/3692; G09G 3/30; G09G 3/3208; G09G 3/3275; G09G 3/3696; G09G 2320/0247; G09G 2320/041; G09G 2320/0233; G09G 2320/0261; G09G 2320/064; G09G 2320/0223; G09G 2320/029; G09G 2320/043; G09G 2300/0426; G09G 2300/0408; G09G 2300/0439; G09G 2300/0842; G09G 2300/0857;

(Continued)

(56) References Cited

U.S. PATENT DOCUMENTS

| | | | |
|---|---|---|---|
| 5,790,459 | A | 8/1998 | Roohparvar |
| 2006/0017701 | A1 | 1/2006 | Marten |

(Continued)

FOREIGN PATENT DOCUMENTS

| | | |
|---|---|---|
| CN | 103943149 | 7/2014 |
| CN | 110827910 | 2/2020 |

(Continued)

*Primary Examiner* — Dong Hui Liang
(74) *Attorney, Agent, or Firm* — Winston Hsu

(57) ABSTRACT

A switch circuit includes a first switch, a second switch, and a third switch, where each switch has a first terminal, a second terminal, and a control terminal. The switch circuit has four signal terminals and three control terminals, where a first signal terminal is coupled to a first terminal of the first switch. A second signal terminal is coupled to a second terminal of the first switch and a first terminal of the second switch. The third signal terminal is coupled to a first terminal of the third switch. The fourth signal terminal is coupled to a second terminal of the second switch and a second terminal of the third switch. The three control terminals of the switch circuit are respectively coupled to control terminals of the three switches, for receiving corresponding control signals.

20 Claims, 11 Drawing Sheets

(58) Field of Classification Search
CPC ... G09G 2310/0205; G09G 2310/0224; G09G 2310/0248; G09G 2310/0281; G09G 2310/0297; G09G 2310/0216; G09G 2310/0245; G09G 2310/0267; G09G 2310/027; G09G 2310/06; G09G 2310/061; G09G 2310/04; G09G 2340/0492
See application file for complete search history.

(56) References Cited

U.S. PATENT DOCUMENTS

| | | | | |
|---|---|---|---|---|
| 2012/0218252 | A1* | 8/2012 | Yamauchi | G09G 3/3618 345/212 |
| 2012/0268446 | A1* | 10/2012 | Yamauchi | G09G 3/3618 345/212 |
| 2014/0204680 | A1 | 7/2014 | Kim | |
| 2020/0051652 | A1 | 2/2020 | Jeong | |

FOREIGN PATENT DOCUMENTS

| | | |
|---|---|---|
| TW | 200301880 | 7/2003 |
| TW | 1553640 | 2/2012 |
| TW | 202347291 | 12/2023 |
| TW | 202443548 | 11/2024 |

* cited by examiner 310 320

| Pin number | Pin name (310) | | Pin name (320) |
|---|---|---|---|
| 1 | CSB2 | → | CSB2 |
| 2 | GDR | → | GDR |
| 3 | RESE | → | RESE |
| 4 | VDD15 | → | VDD15 |
| 5 | VSPL | → | VSPL1/VMTP1 |
| 6 | TSCL | → | TSCL |
| 7 | TSDA | → | TSDA |
| 8 | BS | → | BS |
| 9 | BUSY_N | → | BUSY_N |
| 10 | RST_N | → | RST_N |
| 11 | DC | → | DC |
| 12 | CSB | → | CSB |
| 13 | SCL | → | SCL |
| 14 | SDA | → | SDA |
| 15 | VDDIO | → | VDD |
| 16 | VDD | → | VSNL2 |
| 17 | VSS | → | VSS |
| 18 | VDD_15V | → | VSNL1 |
| 19 | VMTP | → | VSPL2/VMTP2 |
| 20 | VSPH | → | VSPL3 |
| 21 | VGP | → | VGP |
| 22 | VSN | → | VSNL3 |
| 23 | VGN | → | VGN |
| 24 | VCOM | → | VCOM |

FIG. 3

SWITCH CIRCUIT, DISPLAY DRIVING CIRCUIT, DISPLAY SYSTEM, AND CIRCUIT OPERATION METHOD THEREOF

BACKGROUND OF THE INVENTION

1. Field of the Invention

The disclosure relates to a switch circuit, a display driving circuit, a display system, and a circuit operation method thereof, and more particularly to a switch circuit, a display driving circuit, a display system, and a circuit operation method thereof that implement shared functionality of pins.

2. Description of the Prior Art

With the proliferation of electronic devices, chip applications have expanded widely. In the field of circuit design, planning voltage-related pins presents a major challenge. Taking electronic paper display devices as an example, when using two types of electrophoretic particles (e.g., black and white electrophoretic particles) to display black, white, and grayscale images, multiple sets of driving voltages are needed to achieve color control through specific voltage levels and voltage waveforms. When using three types of electrophoretic particles (e.g., black, white, and red electrophoretic particles), or even four types of electrophoretic particles (e.g., black, white, red, and yellow electrophoretic particles) or more types of electrophoretic particles to achieve more complex display effects with richer colors, more sets of driving voltages are required.

To upgrade existing display systems to support more display colors, additional driving voltages are required to support this functionality. Therefore, display driving circuits in display systems must correspondingly generate these driving voltages. The increase in driving voltages means that display driving circuits correspondingly need more pins connected to external capacitors to ensure the stability of the driving voltages. However, the increase in pin count will inevitably affect the existing pin allocation space, for example, causing impact and competition for the allocation of test pins.

In view of the above technical challenges, there is an urgent need in this field for a pin sharing technology that enables a single pin to achieve multiple functions, thereby effectively solving the problem of pin allocation.

SUMMARY OF THE INVENTION

An embodiment provides a switch circuit comprising a first switch, a second switch, a third switch, a first signal terminal, a second signal terminal, a third signal terminal, a fourth signal terminal, a first control terminal, a second control terminal, and a third control terminal. The first switch comprises a first terminal, a second terminal, and a control terminal. The second switch comprises a first terminal, a second terminal, and a control terminal. The third switch comprises a first terminal, a second terminal, and a control terminal. The first signal terminal is coupled to the first terminal of the first switch. The second signal terminal is coupled to the second terminal of the first switch and the first terminal of the second switch. The third signal terminal is coupled to the first terminal of the third switch. The fourth signal terminal is coupled to the second terminal of the second switch and the second terminal of the third switch. The first control terminal is coupled to the control terminal of the first switch, configured to receive a first control signal, where the first control signal is configured to control turning on or turning off of the first switch. The second control terminal is coupled to the control terminal of the second switch, configured to receive a second control signal, where the second control signal is configured to control turning on or turning off of the second switch. The third control terminal is coupled to the control terminal of the third switch, configured to receive a third control signal, where the third control signal is configured to control turning on or turning off of the third switch.

Another embodiment provides a circuit control method configured to control the aforementioned switch circuit, where the circuit control method comprises in a third mode, the first switch is turned on, the second switch is turned off, the third switch is turned on, a third signal path is formed between the third signal terminal and the fourth signal terminal through the third switch, and a fourth signal path is formed between the first signal terminal and the second signal terminal through the first switch.

Another embodiment provides a display driving circuit comprising a plurality of pins, a power generator, a source driver, and a first switch circuit. The plurality of pins, wherein each pin is a hardware interface between internal and external of the display driving circuit, where the plurality of pins comprises a first pin to an nth pin and at least one source driving pin. The power generator comprises a first output terminal to an nth output terminal, configured to respectively provide a first source driving voltage to an nth source driving voltage. The source driver comprises a first input terminal to an nth input terminal, respectively coupled to the first output terminal to the nth output terminal of the power generator, and at least one output terminal, where the at least one output terminal is respectively coupled to the at least one source driving pin, configured to output at least one source driving signal. The first switch circuit comprises a first signal terminal, a second signal terminal, a third signal terminal, and a fourth signal terminal, wherein one of the first signal terminal and the second signal terminal is coupled to the first output terminal of the power generator, and another of the first signal terminal and the second signal terminal is coupled to the first pin. Where n is an integer greater than or equal to 1.

Another embodiment provides a circuit operation method configured to control the aforementioned display driving circuit. The first switch circuit of the display driving circuit further comprises a first switch, a second switch, a third switch, a first signal terminal, a second signal terminal, a third signal terminal, a fourth signal terminal, a first control terminal, a second control terminal, and a third control terminal. The first switch comprises a first terminal, a second terminal, and a control terminal. The second switch comprises a first terminal, a second terminal, and a control terminal. The third switch comprises a first terminal, a second terminal, and a control terminal. The first control terminal is coupled to the control terminal of the first switch, configured to receive a first control signal, where the first control signal is configured to control turning on or turning off of the first switch. The second control terminal is coupled to the control terminal of the second switch, configured to receive a second control signal, where the second control signal is configured to control turning on or turning off of the second switch. The third control terminal is coupled to the control terminal of the third switch, configured to receive a third control signal, where the third control signal is configured to control turning on or turning off of the third switch. The first signal terminal is coupled to the first terminal of the first switch. The second signal terminal is coupled to the second terminal of the first switch and the first terminal of the second switch. The third signal terminal is coupled to the first terminal of the third switch. The fourth signal terminal is coupled to the second terminal of the second switch and the second terminal of the third switch. The circuit operation method comprises in a third mode, the first switch is turned on, the second switch is turned off, the third switch is turned on, a third signal path is formed between the third signal terminal and the fourth signal terminal through the third switch, and a fourth signal path is formed between the first signal terminal and the second signal terminal through the first switch.

Another embodiment provides a display system, where the display system comprises the aforementioned display driving circuit and a display. The plurality of pins of the display driving circuit further comprises at least one gate driving pin. The display driving circuit further comprises a gate driver, where the gate driver comprises at least one input terminal configured to receive at least one gate driving voltage, and at least one output terminal respectively coupled to the at least one gate driving pin, configured to respectively output at least one gate driving signal. The display comprises a plurality of input terminals respectively coupled to the at least one source driving pin and the at least one gate driving pin of the display driving circuit, where the display is configured to display a display image according to at least the at least one source driving signal and the at least one gate driving signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 shows a corresponding schematic diagram of two types of pin configurations of a driving circuit according to an embodiment.

DETAILED DESCRIPTION

Figure 1:
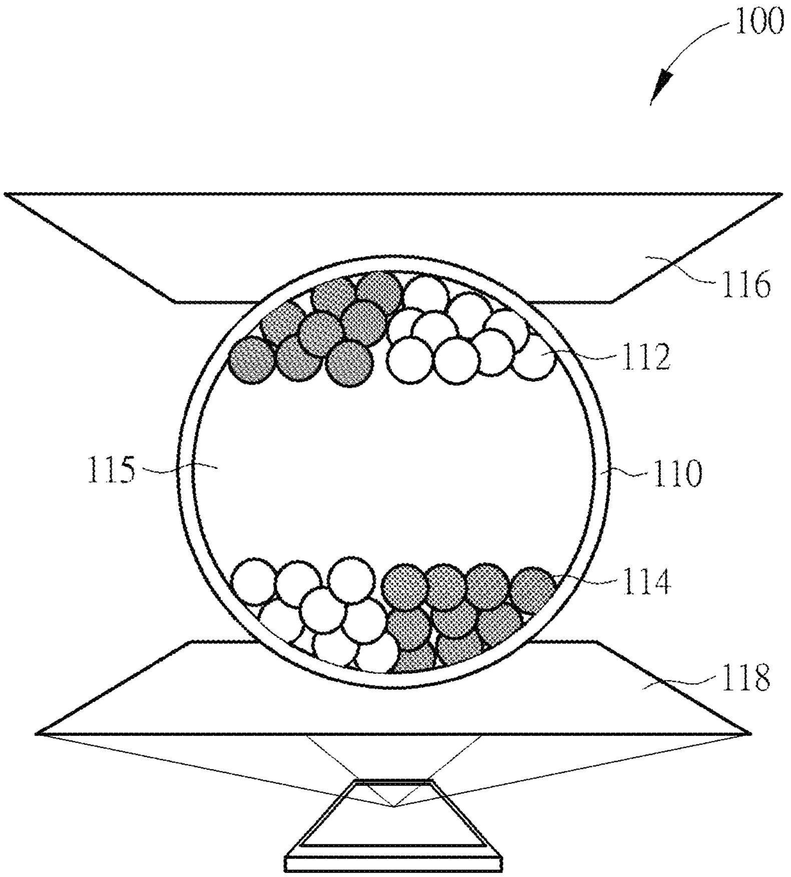
FIG. 1 shows a partial schematic diagram of an electrophoretic display according to an embodiment.

Regarding the terminology and technical features in this document, the relevant explanations are as follows. In this document, "pin" refers to a hardware interface for connection between an integrated circuit (IC) or a silicon die and external components, in the form of die pads, bonding pins, solder balls, or other suitable forms. In this document, when referring to the arrangement of pins, it relates to the position, ordering, and layout of pins on a hardware device. In this document, pins used for transmitting voltages may be coupled to capacitors external to the integrated circuit as needed to achieve the effect of voltage stabilization. When this document mentions that terminals or pins are used to "transmit" signals, it does not limit the transmission direction of signals, where the direction of signal transmission may be sending signals and/or receiving signals. The signals referred to in this document may be voltage signals and/or current signals, where voltage signals may have fixed or varying voltage levels, and current signals may have fixed or varying current levels. When this document uses "and/or" to connect multiple objects, it means including at least one of those objects or any combination thereof. For example, "A, B, and/or C" represents one or multiple scenarios of "A," "B," "C," "A and B," "B and C," "A and C," or "A and B and C." The drawings presented in this document are examples for illustrating principles and may not be drawn to precise hardware dimensional proportions. For ease of understanding, in this document, hardware details that do not affect technical understanding may be appropriately omitted, and those with ordinary knowledge in the art should still fully understand the content. In this document, when A is referred to as B, it means A may be but is not limited to B. In this document, "including" is an open-ended term, and when A is said to include B, it means A includes but is not limited to B. In this document, when voltage stabilization is mentioned, it refers to stabilizing the voltage, for example, reducing voltage ripple. The pin sharing described in this document is understood as a single pin being allowed to support multiple functions.

In this document, when a switch is turned on, the switch is in the on state and is conducting, and signals can transmit through the switch. When a switch is turned off, the switch is in the off state and is non-conducting, and signals cannot transmit through the switch.

The "external programming" operation described in this document refers to applying specific voltages from outside the chip to pins of the chip, thereby performing write operations or program operations on memory inside the chip from external sources. The "external programming" may typically be performed during the chip probing (CP) stage at the wafer level, and may be suitable for writing predetermined data to large quantities of chips, thereby significantly reducing memory programming time and lowering test costs.

The "internal programming" operation described in this document refers to using a power generator inside the chip, and the power generator is configured to provide specific voltages for applying voltage to memory, thereby performing write operations or program operations on memory internally within the chip. The "internal programming" may be performed after the chip completes manufacturing and leaves the factory, and may update stored data in memory elements according to specific requirements.

Regarding technical features of embodiments, the following description uses an Electrophoretic Display (EPD) as an example. FIG. 1 shows a partial schematic diagram of an electrophoretic display 100 according to an embodiment. The electrophoretic display 100 may include multiple microcapsules as pixels, with a microcapsule 110 shown as an example in the figure. Each microcapsule contains multiple electrophoretic microparticles. For example, negatively charged white electrophoretic microparticles 112 and positively charged black electrophoretic microparticles 114. The electrophoretic microparticles may be placed in a transparent liquid 115. The transparent liquid 115 may be a non-polar organic solution or suitable liquid. By applying appropriate driving voltages to an upper electrode 116 and a lower electrode 118, the electrophoretic microparticles may move to predetermined positions and reach a stable state, thereby controlling a display screen to present white, black, or specific grayscale colors. The driving voltages applied to the upper electrode 116 and the lower electrode 118 must have appropriate voltage levels and voltage waveforms in order to gradually move the electrophoretic microparticles to appropriate positions to present expected display effects.

Electrophoretic displays do not require a backlight source and power supply is not required when they in stable states, thus possessing extremely low power consumption characteristics, making them have significant application value in application fields such as electronic paper (E-paper), electronic signage, Electronic Shelf Labels (ESL), and wearable devices.

FIG. 1 uses a display presenting white, black, and grayscale as an example to illustrate basic operating principles. The display in FIG. 1 uses two types of electrophoretic microparticles, black and white, to display colors. However, current technology has developed electrophoretic displays with richer color performance. For example, more advanced displays may use three types of electrophoretic microparticles: black, white, and red, to display more colors. In another embodiment, a display may use three types of electrophoretic microparticles: black, white, and yellow, to display multiple colors. In yet another example, a display may use four types of electrophoretic microparticles: black, white, red, and yellow, to display multiple colors. By analogy, if more types of electrophoretic microparticles are used, by adjusting the positions and states of the electrophoretic microparticles, the display may support displaying richer and more colors (such as presenting four or more colors).

To effectively control the aforementioned three, four, or more types of electrophoretic microparticles, the number of required driving voltages may also increase accordingly. Electrophoretic displays do not directly present desired colors by merely applying one set of voltages. Instead, the electrophoretic displays must be driven by applying predetermined voltage waveforms over a period of time to present the desired colors.

For example, displays using two types of electrophoretic microparticles, three types of electrophoretic microparticles, or four types of electrophoretic microparticles may be driven by four voltages, thus using 2-bit driving voltage selection, which controls $2^2$ types of voltages, namely four voltages.

For displays with five or more colors, seven voltages (for example, three different positive voltages, three different negative voltages, and a ground voltage) may be used for driving, thus using 3-bit driving voltage selection, which may control at most $2^3$ types of voltages, namely eight voltages, thus supporting driving with seven voltages.

Each voltage described herein may have fixed or non-fixed voltage levels as needed, thus supporting the provision of voltage waveforms. Therefore, if the number of driving voltages of a display driving circuit can be increased, it helps achieve more complex voltage driving requirements. However, in practice, if the layout and configuration of the system circuit board, which is external to the display driving circuit, must be modified correspondingly, an increase in the number of connector pins would be required. The resulting time costs and development expenses may be excessive, thus requiring a more appropriate solution.

Considering the importance of product compatibility, embodiments of the present disclosure may only need to improve the internal design of an integrated circuit without changing the number and configuration of pins. Under upgrade requirements for expanding color specifications of display systems, compatibility between new and original products must be considered. Therefore, the embodiments of the present disclosure provide a solution that only requires modifications of the internal design of the integrated circuit without changing the number and configuration of pins.

The technology of the present disclosure may minimize the degree of design changes required for the circuit board of display systems to improve compatibility. Specifically, circuit board interfaces (such as pads on a circuit board) used to couple to integrated circuit pins may remain unchanged, thus achieving product function upgrades, such as upgrading from 2-bit driving voltage selection to 3-bit driving voltage selection (for example, upgrading to displays with five or more colors).

Figure 2A:
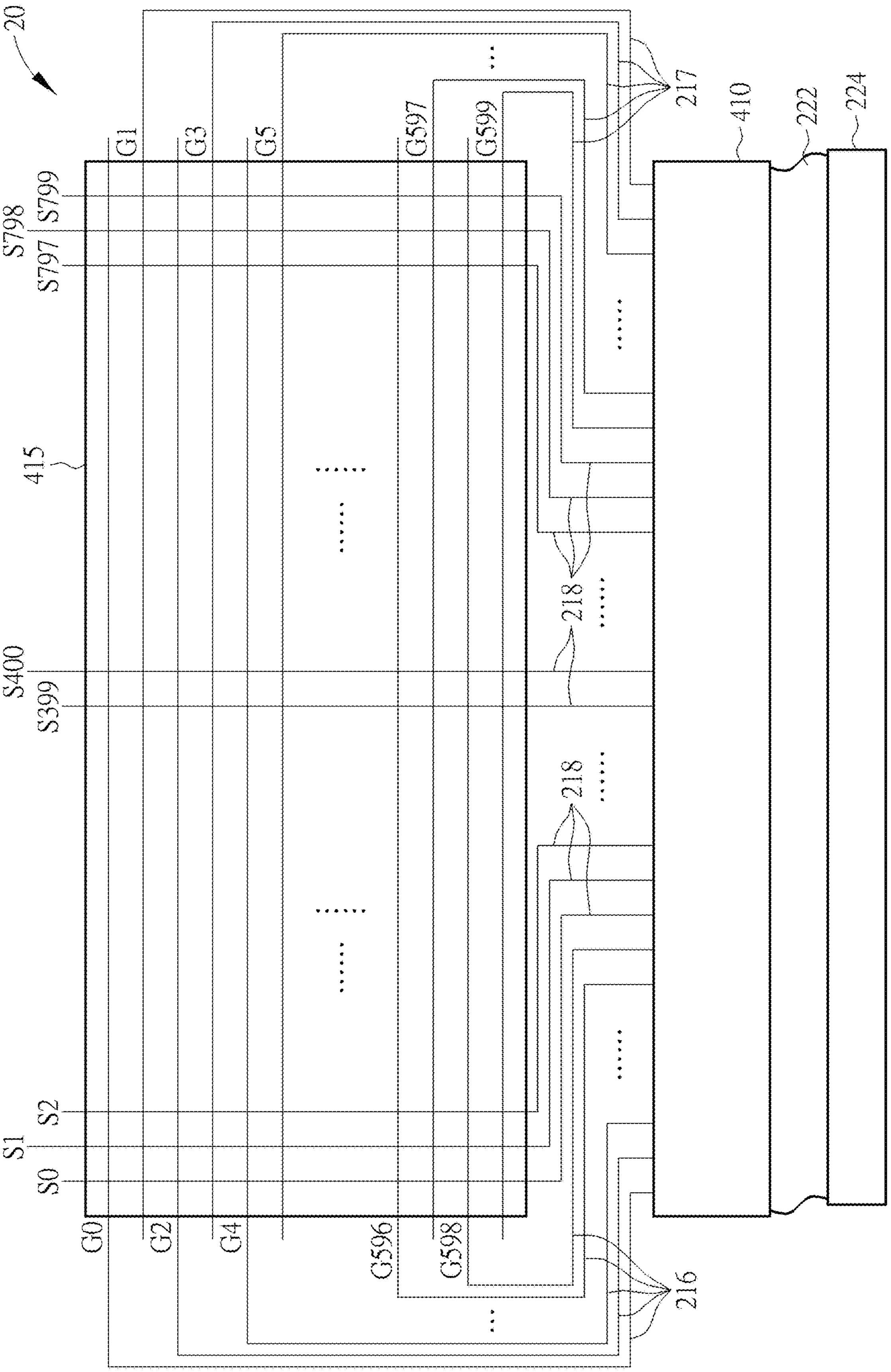
FIG. 2A shows a schematic diagram of a display system according to an embodiment.
Figure 2B:
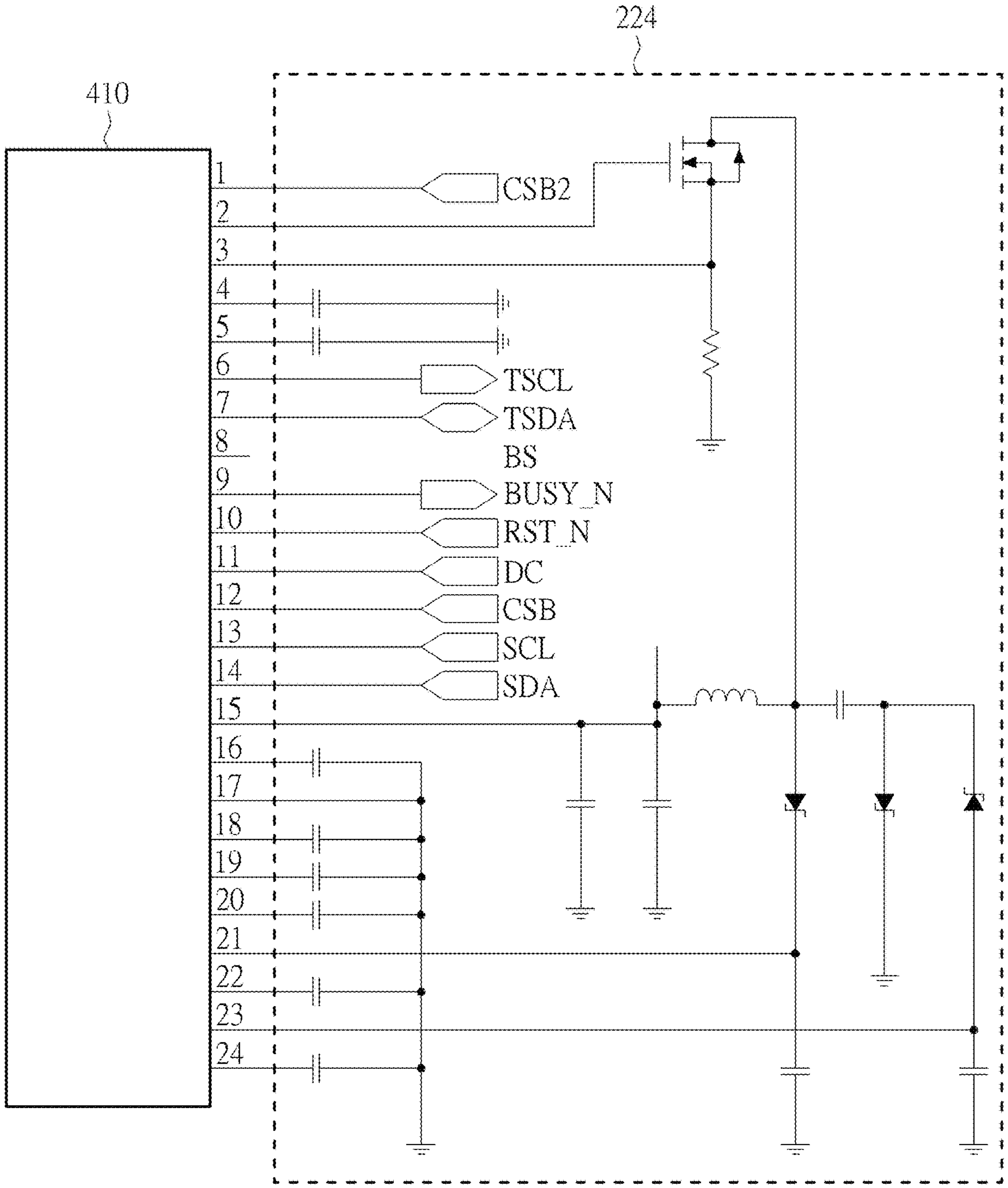
FIG. 2B shows a schematic diagram of a portion of pin configuration of the driving circuit and component arrangement of a printed circuit board in FIG. 2A.

FIG. 2A shows a schematic diagram of a display system 20 according to an embodiment. The display system 20 may include a display driving circuit 410, a display panel 415, conductive paths 216, 217, and 218, a Flexible Printed Circuit (FPC) 222, and a Printed Circuit Board (PCB) 224. FIG. 2B shows a schematic diagram of a portion of the pin configuration of the display driving circuit 410 and the component arrangement of the printed circuit board 224 in FIG. 2A.

The display driving circuit 410 may be an integrated circuit or other suitable hardware form. The display panel 415 may be but is not limited to an electronic paper display panel. The pin names in FIG. 2A and FIG. 2B are merely examples to illustrate principles, and embodiments are not limited thereto. It should be noted that for brevity, FIG. 2B only illustrates a portion of the pins of the display driving circuit 410 for ease of explanation.

The conductive paths 216, 217, and 218 may be transparent electrodes or suitable hardware conductive paths. The conductive path 216 may be coupled to the even gate lines of the display panel 415 (labeled as G0, G2, G4 . . . G598). The conductive path 218 may be coupled to the source lines of the display panel 415 (labeled as S0, S1, S2 . . . S799). The conductive path 217 may be coupled to the odd gate lines of the display panel 415 (labeled as G1, G3, G5 . . . G599). Here, the numbers and designations of gate lines and source lines are merely examples to aid understanding, and embodiments are not limited thereto.

Generally, when the display driving circuit 410 supplies gate driving signals to the gate lines of the display panel 415, scanning may be performed line by line with a relatively small load. In contrast, when the display driving circuit 410 supplies source driving signals to the source lines of the display panel 415, it may need to simultaneously supply multiple source lines (for example, dozens or hundreds) for driving, resulting in a very large instantaneous load. Therefore, source driving voltages may need to be coupled to large capacitive elements external to a chip for voltage stabilization.

In an example of FIG. 2A, the display panel 415 may be located above the display driving circuit 410, so the pins located on the upper edge of the display driving circuit 410 may be coupled to the display panel 415. The pins located on the lower edge of the display driving circuit 410 may be coupled to the printed circuit board 224 via the flexible printed circuit board 222. The pins located on the lower edge of the display driving circuit 410 may include the pins VSPL1, VSPL2, VSPL3, VSNL1, VSNL2, and VSNL3 related to source driving voltages, which may be configured to support 3-bit driving voltage selection.

On the printed circuit board 224, the pins VSPL1, VSPL2, VSPL3, VSNL1, VSNL2, and VSNL3 related to source driving voltages may be coupled to capacitors for voltage stabilization. Additionally, other components may be arranged on the printed circuit board 224, as shown in FIG. 2B, to perform various functions. The component arrangement in FIG. 2B is merely an example, and the specifications and arrangement of capacitors, inductors, diodes, transistors, and other components in FIG. 2B may be flexibly adjusted according to requirements.

FIG. 3 shows a corresponding schematic diagram of two types of pin configurations of a driving circuit according to an embodiment. A pin configuration 310 may be an original pin configuration, and a pin configuration 320 may be an upgraded pin configuration. As mentioned above, to expand the display colors of a display system, the pin configuration 310 may be changed to the pin configuration 320, and the correspondence relationship between their pins is shown in the figure (the pin correspondence relationship in FIG. 3 is only for example illustration and does not limit the scope of embodiments).

The pin configuration 310 may support at most four types of driving voltages, namely performing 2-bit driving voltage selection. For example, the pin configuration 310 may support electrophoretic displays using two types of electrophoretic microparticles (e.g., black, white), three types of electrophoretic microparticles (e.g., black, white, red or yellow), or four types of electrophoretic microparticles (e.g., black, white, red, yellow) for display.

The pin configuration 320 may support at most eight types of driving voltages, namely performing 3-bit driving voltage selection. For example, the pin configuration 320 may support electrophoretic displays presenting five or more display colors. The pin configuration 320 may be applied to the pin configuration of FIG. 2B.

After modifying the pin configuration 310 into the pin configuration 320, the source driving voltages that the display driving circuit 410 can provide may be expanded from three driving voltages (VSPL, VSPH, VSN on the pins numbered 5, 20, 22) to six driving voltages (VSPL1, VSPL2, VSPL3, VSNL1, VSNL2, VSNL3 on the pins numbered 5, 19, 20, 18, 16, 22). The number of control bits for driving voltage selection may be improved from 2 bits to 3 bits without changing the number and positions of pins. Thus, no adjustment to the pin design of the printed circuit board 224 is required, thereby ensuring product compatibility. Even in some cases where other component configurations on the printed circuit board 224 may require fine-tuning, the pin design on the printed circuit board 224 may be allowed to remain unchanged, thus minimizing the extent of adjustment.

As shown in the pin configuration 310 and the pin configuration 320 in FIG. 3, the pin VMTP (pin number 19) of the pin configuration 310 can correspond to the pin VSPL2/VMTP2 of the pin configuration 320. When the pin configuration 310 is modified to the pin configuration 320, for the functional modifications of the related pins, the internal circuit design of the display driving circuit should be correspondingly modified.

In the original pin configuration 310, the pin VMTP may be used to input predetermined signals to perform predetermined operations on the display driving circuit. For example, during the chip probing (CP) stage at the wafer level, predetermined voltage signals may be input from external sources (e.g., test equipment) through the pin VMTP to perform external operations on the display driving circuit. For example, the external operations may involve "external programming" of memory.

However, after modification to the pin configuration 320, the pin VSPL2/VMTP2 may have shared functionality (namely, a single pin may support multiple functions). In different modes, the pin VSPL2/VMTP2, numbered 19, may support transmitting internal signals (e.g., the internal source driving voltage VSPL2) to the external of the chip (e.g., external voltage decoupling capacitors), and may support transmitting signals from external sources (e.g., the external programming voltage VMTP2) to the internal of the chip. Through this pin sharing functionality, not only may the original external programming operations be retained to save test time, but additional source driving voltages may also be provided to achieve display color upgrades. Similarly, the pin VSPL/VMTP1, numbered 5, in the pin configuration 320 may have shared functionality. Therefore, the display driving circuit 410 must correspondingly adjust the circuit design to support pin sharing, and further technical details will be described below.

To implement pin sharing functionality, embodiments may provide the following technology.

Figure 4:
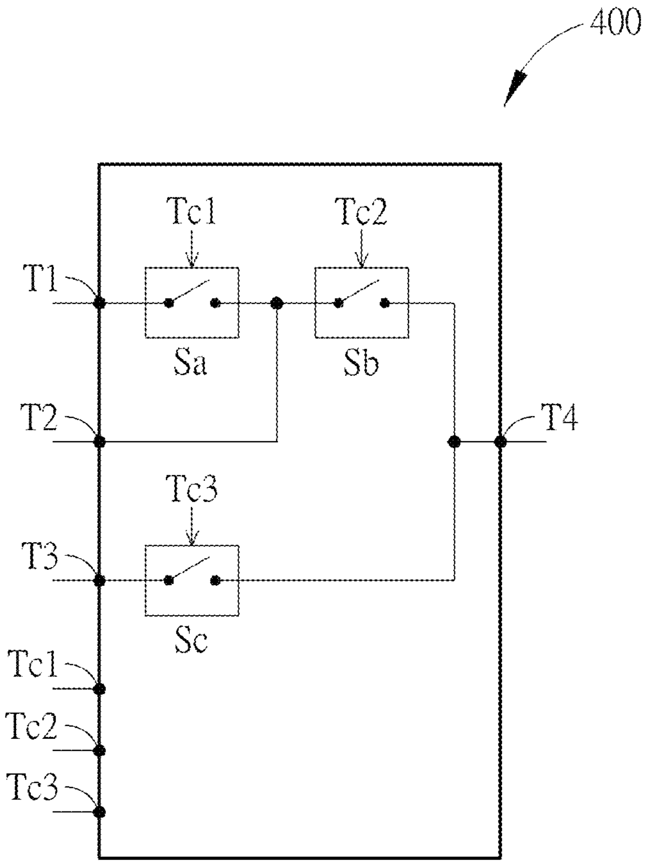
FIG. 4 shows a structural schematic diagram of a switch circuit according to an embodiment.

FIG. 4 shows a structural schematic diagram of a switch circuit 400 according to an embodiment. The switch circuit 400 may include a first switch Sa, a second switch Sb, a third switch Sc, a first signal terminal T1, a second signal terminal T2, a third signal terminal T3, a fourth signal terminal T4, a first control terminal Tc1, a second control terminal Tc2, and a third control terminal Tc3.

Each of the first switch Sa, the second switch Sb, and the third switch Sc may include a first terminal, a second terminal, and a control terminal.

In FIG. 4, a terminal on the left side of a switch may be the first terminal of the switch, and a terminal on the right side may be the second terminal. Those of ordinary skill in the art should understand that FIG. 4 is merely a circuit schematic diagram used to illustrate principles and is not used to limit the actual circuit hardware layout. The first switch Sa, the second switch Sb, and the third switch Sc may be formed using transistors or components capable of being in an on state (conducting) or an off state (non-conducting). For example, Metal-Oxide-Semiconductor Field-Effect Transistors (MOSFETs), Bipolar Junction Transistors (BJTs), Insulated Gate Bipolar Transistors (IGBTs), Silicon Controlled Rectifiers (SCRs), Gate Turn-Off Thyristors (GTOs), Complementary Metal-Oxide-Semiconductor (CMOS) switches, Junction Field-Effect Transistors (JFETs), High Electron Mobility Transistors (HEMTs), Static Induction Transistors (SITs), Two-Dimensional Electron Gas Field-Effect Transistors (2DEG FETs), Silicon Carbide (SiC) or Gallium Nitride (GaN) based power devices, Micro-Electro-Mechanical Systems (MEMS) switches, or other switching elements in integrated circuits having an on state (conducting) and an off state (non-conducting) may be used.

The first signal terminal T1 may be coupled to the first terminal of the first switch Sa. The second signal terminal T2 may be coupled to the second terminal of the first switch Sa. The third signal terminal T3 may be coupled to the first terminal of the third switch Sc. The fourth signal terminal T4 may be coupled to the second terminal of the second switch Sb. The first control terminal Tc1 may be coupled to the control terminal of the first switch Sa to control whether the first switch Sa is turned on or turned off. The second control terminal Tc2 may be coupled to the control terminal of the second switch Sb to control whether the second switch Sb is turned on or turned off. The third control terminal Tc3 may be coupled to the control terminal of the third switch Sc to control whether the third switch Sc is turned on or turned off. The second terminal of the first switch Sa may be coupled to the first terminal of the second switch Sb and commonly coupled to the second signal terminal T2. The second terminal of the third switch Sc may be coupled to the second terminal of the second switch Sb and commonly coupled to the fourth signal terminal T4.

Each of the first switch Sa, the second switch Sb, and the third switch Sc may have two states: an on state (conducting) and an off state (non-conducting). Accordingly, there are eight modes resulting from the combinations of the on and off states of the first switch Sa, the second switch Sb, and the third switch Sc (namely, 2×2×2=8 modes), and these eight modes respectively correspond to eight signal path patterns. By appropriately utilizing combinations of these modes for signal path switching, the aforementioned pin sharing feature may be achieved.

The eight modes of the switch circuit 400 are described in Table 1.

TABLE 1

| Modes of Switch circuit 400 | First switch Sa | Second switch Sb | Third switch Sc |
|---|---|---|---|
| First Mode | Off | On | Off |
| Second Mode | On | On | Off |
| Third Mode | On | Off | On |
| Fourth Mode | Off | Off | On |
| Fifth Mode | Off | On | On |
| Sixth Mode | On | Off | Off |
| Seventh Mode | On | On | On |
| Eighth Mode | Off | Off | Off |

Figure 5:
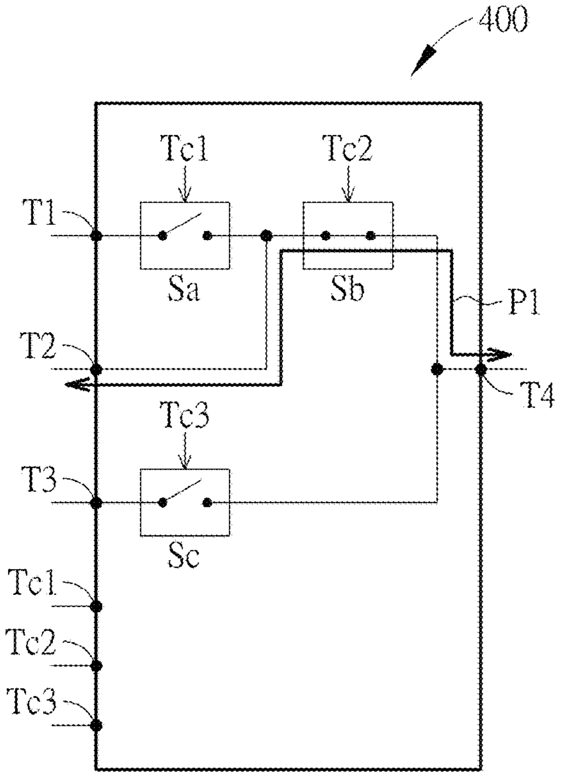
FIG. 5 and FIG. 6 show schematic diagrams of the switch circuit of FIG. 4 operating in multiple modes.
Figure 5:
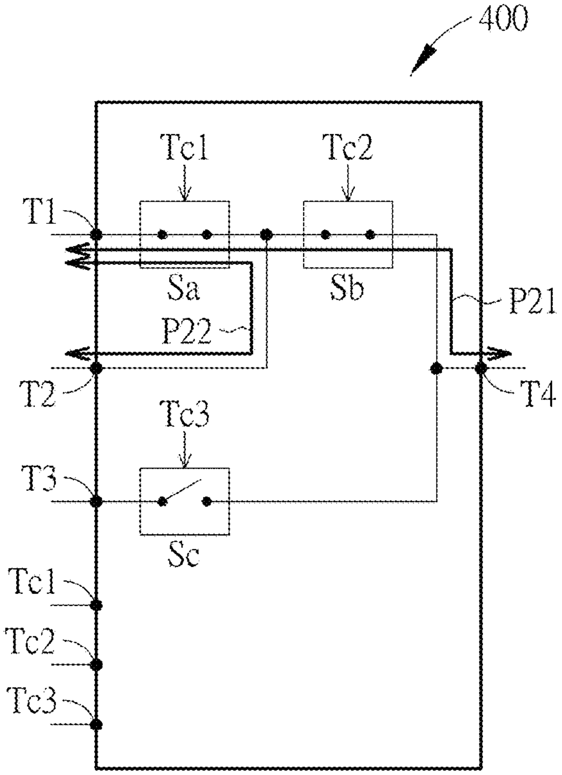
Figure 5:
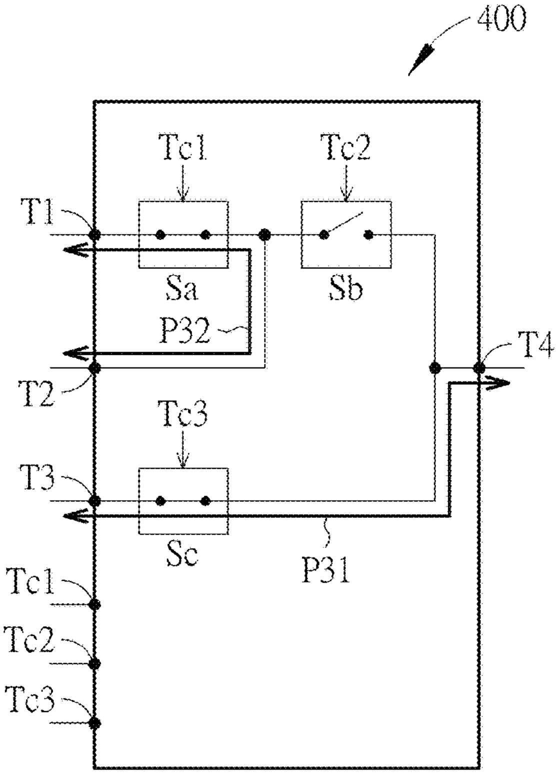
Figure 6:
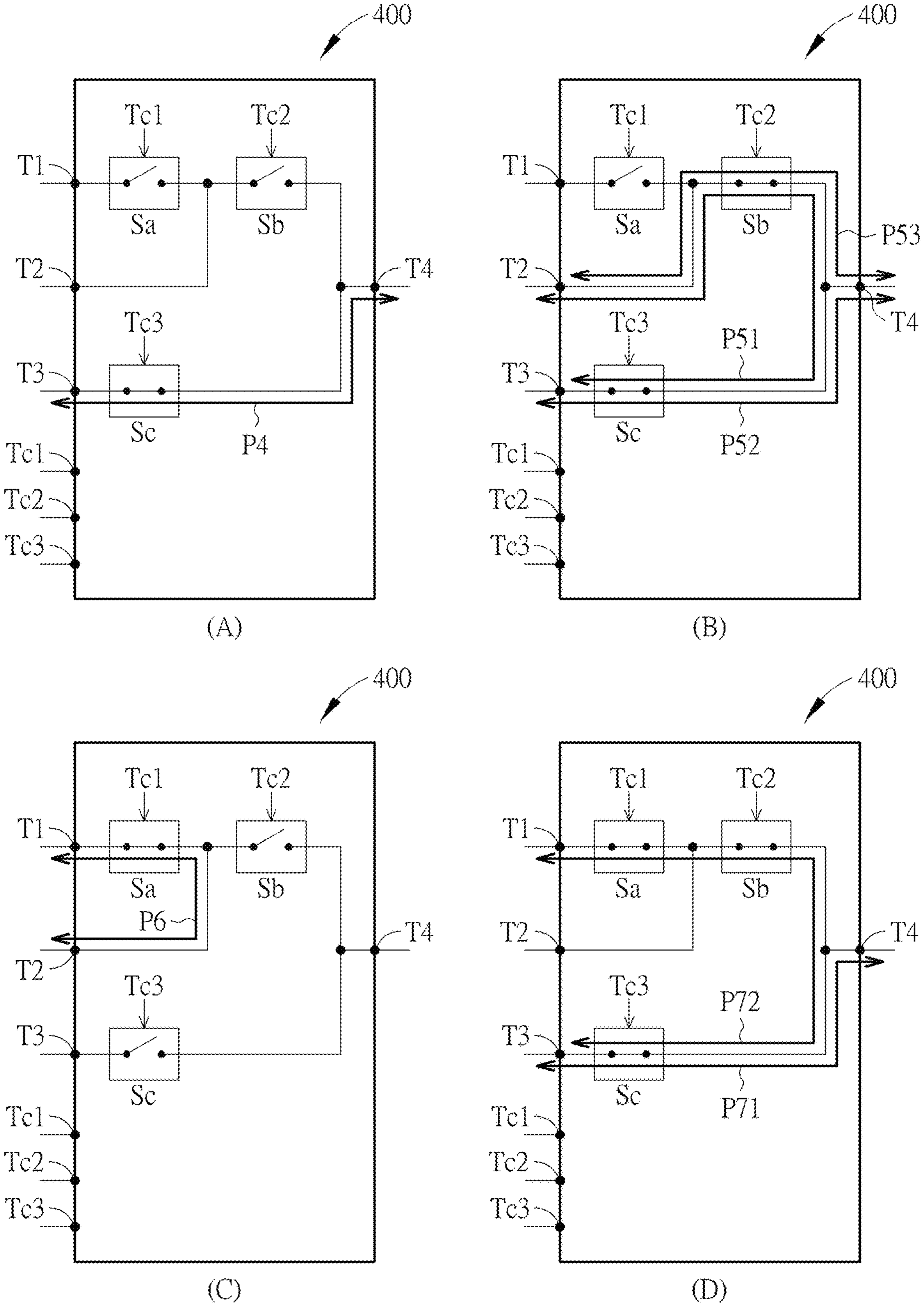

FIG. 5 and FIG. 6 show schematic diagrams of the switch circuit 400 of FIG. 4 in various modes.

FIG. 5(A) shows the first mode of Table 1. In the first mode, the first switch Sa may be turned off, the second switch Sb may be turned on, the third switch Sc may be turned off, and a signal path P1 may be formed between the second signal terminal T2 and the fourth signal terminal T4 through the second switch Sb.

FIG. 5(B) shows the second mode of Table 1. In the second mode, the first switch Sa may be turned on, the second switch Sb may be turned on, the third switch Sc may be turned off. A signal path P21 may be formed between the first signal terminal T1 and the fourth signal terminal T4 through the first switch Sa and the second switch Sb. A signal path P22 may be formed between the first signal terminal T1 and the second signal terminal T2 through the first switch Sa.

FIG. 5(C) shows the third mode of Table 1. In the third mode, the first switch Sa may be turned on, the second switch Sb may be turned off, the third switch Sc may be turned on. A signal path P31 may be formed between the third signal terminal T3 and the fourth signal terminal T4 through the third switch Sc. A signal path P32 may be formed between the first signal terminal T1 and the second signal terminal T2 through the first switch Sa. It should be noted that in the case of the third mode, two independent signal paths may be formed inside the switch circuit 400: the signal path P31 and the signal path P32.

FIG. 6(A) shows the fourth mode of Table 1. In the fourth mode, the first switch Sa may be turned off, the second switch Sb may be turned off, the third switch Sc may be turned on, and a signal path P4 may be formed between the third signal terminal T3 and the fourth signal terminal T4 through the third switch Sc.

FIG. 6(B) shows the fifth mode of Table 1. In the fifth mode, the first switch Sa may be turned off, the second switch Sb may be turned on, the third switch Sc may be turned on. A signal path P51 may be formed between the second signal terminal T2 and the third signal terminal T3 through the second switch Sb and the third switch Sc. A signal path P52 may be formed between the third signal terminal T3 and the fourth signal terminal T4 through the third switch Sc. A signal path P53 may be formed between the second signal terminal T2 and the fourth signal terminal T4 through the second switch Sb.

FIG. 6(C) shows the sixth mode of Table 1. In the sixth mode, the first switch Sa may be turned on, the second switch Sb may be turned off, the third switch Sc may be turned off. A signal path P6 may be formed between the first signal terminal T1 and the second signal terminal T2 through the first switch Sa.

FIG. 6(D) shows the seventh mode of Table 1. In the seventh mode, the first switch Sa, the second switch Sb, and the third switch Sc may all be turned on. A signal path P71 may be formed between the third signal terminal T3 and the fourth signal terminal T4 through the third switch Sc. A signal path P72 may be formed between the first signal terminal T1 and the third signal terminal T3 through the first switch Sa, the second switch Sb, and the third switch Sc.

In FIG. 5 and FIG. 6, signal paths that are not labeled may also be flexibly utilized. For example, in FIG. 5(B), a signal path may also exist between the second signal terminal T2 and the fourth signal terminal T4. In FIG. 6(D), in addition to the signal paths described above, a signal path may exist between the first signal terminal T1 and the second signal terminal T2, a signal path may exist between the first signal terminal T1 and the fourth signal terminal T4, a signal path may exist between the second signal terminal T2 and the fourth signal terminal T4, and a signal path may exist between the second signal terminal T2 and the third signal terminal T3. These signal paths can all be flexibly utilized according to requirements.

In the eighth mode of Table 1, the first switch Sa, the second switch Sb, and the third switch Sc may all be turned off, no signal paths are formed between the various signal terminals, and this mode may be used for an idle state or an initial state, for example.

By switching between the aforementioned multiple modes of the switch circuit 400, pins may perform required operations in different modes, thereby achieving multiple functions for a single pin, namely pin sharing. Further details will be described below.

Figure 7:
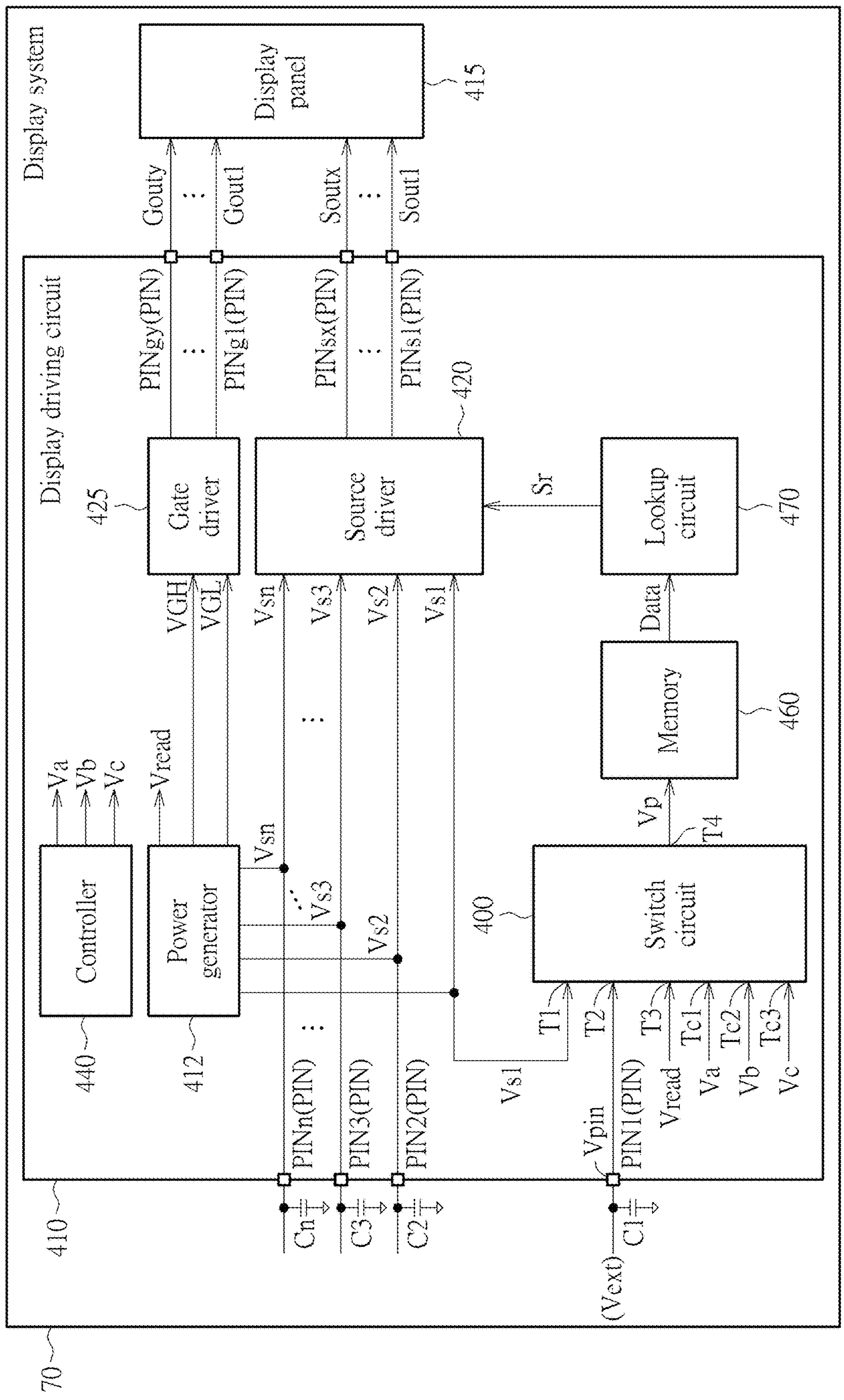
FIG. 7 shows a schematic diagram of a display system according to an embodiment.

FIG. 7 shows a schematic diagram of a display system 70 according to an embodiment. The display system 70 may include a display driving circuit 410 and a display panel 415. The display driving circuit 410 and the display panel 415 may substantially correspond to the display driving circuit 410 and the display panel 415 of FIG. 2A, respectively. According to an embodiment, the display driving circuit 410 may be a display driver integrated circuit (DDIC). The display panel 415 may include an Electrophoretic Display (EPD). The display system 70 may be used for Electronic Shelf Labels (ESL) or e-paper displays.

The display driving circuit 410 may include a power generator 412, a source driver 420, a gate driver 425, the switch circuit 400, a controller 440, a memory 460, a lookup circuit 470, and a plurality of pins PIN. Each pin of the plurality of pins PIN may be a hardware interface between the internal and external of the display driving circuit 410, configured to transmit voltages and currents between the internal and external of the display driving circuit 410. The plurality of pins PIN may include the pins PIN1 to PINn, a plurality of source driving pins PINs1 to PINsx, and a plurality of gate driving pins PINg1 to PINgy.

The power generator 412 may include a first output terminal to an nth output terminal, configured to respectively provide a first source driving voltage Vs1 to an nth source driving voltage Vsn, where n may be an integer greater than or equal to 1. The power generator 412 may also provide the gate driving voltages VGH and VGL, and a predetermined signal Vread.

The source driver 420 may include a first input terminal to an nth input terminal, respectively coupled to the first output terminal to the nth output terminal of the power generator 412, to receive the first source driving voltage Vs1 to the nth source driving voltage Vsn. The source driver 420 may further include at least one output terminal, respectively coupled to the source driving pins PINs1 to PINsx, configured to output source driving signals Sout1 to Soutx to the display panel 415. Here, x may be an integer greater than or equal to 1. If a pixel array of the display panel 415 has x source lines, the x source lines may respectively receive the source driving signals Sout1 to Soutx for driving. The source driver 420 may further include a data input terminal configured to receive a lookup result Sr from the lookup circuit 470. The source driver 420 may select the first source driving voltage Vs1 to the nth source driving voltage Vsn according to the lookup result Sr to generate the source driving signals Sout1 to Soutx. The lookup result Sr may be configured to control voltage levels and waveforms of the source driving signals Sout1 to Soutx, and the lookup result Sr may correspond to the aforementioned 2-bit or 3-bit driving voltage selection. For example, in the case applicable to displays with five or more colors, seven source driving voltages may be needed, so the lookup result Sr may be 3-bit data obtained from predetermined data Data in the memory 460.

The gate driver 425 may include at least one input terminal and at least one output terminal, where the input terminal may receive the gate driving voltages VGH and VGL from the power generator 412, and the at least one output terminal may be respectively coupled to the gate driving pins PINg1 to PINgy to respectively output gate driving signals Gout1 to Gouty to the display panel 415. The gate driving voltages VGH and VGL may have different voltage levels, for example, the gate driving voltages VGH and VGL may be high level and low level, respectively. Here, y may be an integer greater than or equal to 1. If a pixel array of the display panel 415 has y gate lines, the y gate lines may respectively receive the gate driving signals Gout1 to Gouty for driving.

The architecture of the switch circuit 400 in FIG. 7 may be substantially the circuit architecture shown in FIG. 4. Specifically, in FIG. 7, the first signal terminal T1 of the switch circuit 400 may be coupled to the power generator 412 to receive the first source driving voltage Vs1. The second signal terminal T2 of the switch circuit 400 may be coupled to the pin PIN1 of the display driving circuit 410 and externally connected to a capacitor C1. The third signal terminal T3 of the switch circuit 400 may be coupled to the power generator 412 to receive the predetermined signal Vread. The fourth signal terminal T4 of the switch circuit 400 may be configured to transmit an operation signal Vp between the switch circuit 400 and the memory 460. The first control terminal Tc1, the second control terminal Tc2, and the third control terminal Tc3 of the switch circuit 400 may be coupled to the controller 440 to respectively receive control signals Va, Vb, and Vc, thereby controlling the on and off states of the first switch Sa to the third switch Sc.

The memory 460 may include an input terminal and an output terminal. The input terminal may be coupled to the fourth signal terminal T4 of the switch circuit 400 to receive the operation signal Vp, and the output terminal may be configured to output predetermined data Data stored in the memory 460, where the predetermined data Data may be multi-bit data. The operation signal Vp may be a read voltage, write voltage, or test voltage for the memory 460, depending on a state of the display driving circuit 410. According to an embodiment, the memory 460 may include but is not limited to non-volatile memory, where the non-volatile memory may include at least one of flash memory, Electrically Erasable Programmable Read-Only Memory (EEPROM), Multiple Time Programmable (MTP) memory, Resistive Random Access Memory (RRAM), floating gate memory, charge trap memory, Phase Change Memory (PCM), Ferroelectric Random Access Memory (FeRAM), Magnetic Random Access Memory (MRAM), Silicon-Oxide-Nitride-Oxide-Silicon (SONOS) memory, and charge storage memory. Those of ordinary skill in the art should understand that the memory 460 may also include other input terminals and output terminals, such as data input terminals, but for brevity, they are not shown in the drawings.

The lookup circuit 470 may include an input terminal and an output terminal. The input terminal may be coupled to the output terminal of the memory 460 to receive the predetermined data Data, and the output terminal may be configured to output the lookup result Sr to the source driver 420 according to the predetermined data Data. Taking the aforementioned display panel with five or more colors as an example, when using multiple types of electrophoretic microparticles for display, 3-bit driving voltage selection must be performed, and the corresponding lookup result Sr may include 3-bit data. According to an embodiment, a lookup table may be provided in the lookup circuit 470.

The memory 460 may store waveform parameters of driving signals of the display driving circuit 410. The waveform parameters of the memory 460 may be configured to describe timing and levels of driving signals, for example, the source driving signals Sout1-Soutx and the gate driving signals Gout1-Gouty. When updating screen content of the display panel 415, the predetermined data Data stored in the memory 460 may be read to the lookup circuit 470, namely the predetermined data Data may be loaded into the lookup circuit 470. The lookup circuit 470 may obtain corresponding driving waveform parameters according to a query of the received predetermined data Data, and output the lookup result Sr. The lookup result Sr output by the lookup circuit 470 may be configured to define waveforms of driving signals such as the source driving signals Sout1-Soutx and the gate driving signals Gout1-Gouty. The source driver 420 may receive the lookup result Sr, and the source driver 420 may control waveforms of the source driving signals Sout1-Soutx according to the lookup result Sr. By sending the source driving signals Sout1-Soutx with specific waveforms to the display panel 415, states of electrophoretic microparticles in the display panel 415 may be changed, thereby presenting required images.

It should be understood: (1) The data stored in the memory 460 may be used to define waveform parameters of driving signals, such as timing and levels of waveforms; (2) Applying driving signals with predetermined waveforms to electrodes of pixels of the display panel 415 may change positions and states of electrophoretic microparticles within microcapsules; (3) Overall states of electrophoretic microparticles may determine visual results presented by the display panel 415. In other words, the data stored in the memory 460 corresponds to the display image to be presented.

Furthermore, the second output terminal to the nth output terminal of the power generator 412 may be respectively coupled to the pins PIN2 to PINn of the display driving circuit 410. As shown in FIG. 7, the pins PIN1 to PINn may be respectively coupled to capacitors C1, C2 to Cn external to the display driving circuit 410. The capacitors C1 to Cn may respectively perform voltage stabilization for the first source driving voltage Vs1 to the nth source driving voltage Vsn of the power generator 412.

The reason why the source driving voltages Vs1 to Vsn need to be coupled to external capacitors for voltage stabilization is as follows. When the source driving voltages Vs1 to Vsn are supplied to source lines of the display panel 415 through the source driving signals Sout1 to Soutx output by the source driver 420, it may be necessary to simultaneously supply hundreds or more source lines for current sinking, resulting in a very large instantaneous load. Therefore, it is necessary to couple the source driving voltages Vs1 to Vsn to large capacitive elements external to the chip for voltage stabilization.

Regarding the capacitors C1 to Cn external to the display driving circuit 410, the capacitors C2 to Cn may directly perform voltage stabilization for the second source driving voltage Vs2 to the nth source driving voltage Vsn. However, since the pin PIN1 is a shared pin and the pin PIN1 may perform different functions at different times, the capacitor C1 can perform voltage stabilization for the first source driving voltage Vs1 when the switch circuit 400 operates in a specific mode and transmits the first source driving voltage Vs1 through the pin PIN1.

Table 2 below describes circuit operation methods and multiple operation modes of the display system 70, but it should be understood that Table 2 is only provided as an example to specifically illustrate the present disclosure and is not intended as a limitation.

An operation mode 1, an operation mode 2, an operation mode 3, and an operation mode 4 of Table 2 may be executed at different time periods rather than simultaneously.

The timing of the operation mode 1, the operation mode 2, the operation mode 3, and the operation mode 4 may be set according to actual requirements. That is, they are not limited to sequential execution, and appropriate operation modes may be selected according to actual requirements.

The operation mode 1 of Table 2 may correspond to the state of the switch circuit 400 shown in FIG. 5(A), which shows the display driving circuit 410 performing external programming on the memory 460, for example: the display driving circuit 410 may perform external programming on the memory 460 during a chip probing (CP) stage at a wafer level, or the display driving circuit 410 may perform external programming on the memory 460 during any test stage.

The operation mode 2 of Table 2 may correspond to the state of the switch circuit 400 shown in FIG. 5(B), which may be for the display driving circuit 410 to perform internal programming on the memory 460, for example: after the chip leaves the factory, users can perform internal programming on the memory 460.

The operation mode 3 of Table 2 may correspond to the state of the switch circuit 400 shown in FIG. 6(A), where the memory 460 may reload the predetermined data Data into the lookup circuit 470.

The operation mode 4 of Table 2 may correspond to the state of the switch circuit 400 shown in FIG. 5(C), to enable the source driver 420 to refresh the screen of the display panel 415. Related details are described below.

TABLE 2

(Corresponding to FIG.7)

| Operation Modes of Display System 70 | Operation Mode 1 | Operation Mode 2 | Operation Mode 3 | Operation Mode 4 |
|---|---|---|---|---|
| Operation Content | Programming Memory 460 by external power | Programming Memory 460 by internal power | Loading data of Memory 460 into Lookup circuit 470 | Update display image of Display panel 415 |
| Display System State | Write to Memory 460 | Write to Memory 460 | Reload Lookup circuit 470 | Refresh Display panel 415 |
| Display Driving Circuit State | Inactive | Inactive | Inactive | Active |
| Memory State | Write | Write | Read | Read |
| States of First Switch Sa, Second Switch Sb, Third Switch Sc | As shown in FIG.5(A) | As shown in FIG.5(B) | As shown in FIG.6(A) | As shown in FIG.5(C) |
| First Driving Voltage Vs1 | None/Default level V1 | Write level VPGM | None/Default level V1 | Drive level VS1 |
| External Input Voltage Vext | Write level VPGM | None | None | None |
| Predetermined Signal Vread | None/Read level VRD | None/Read level VRD | Read level VRD | Read level VRD |
| Operation Signal Vp | Write level VPGM | Write level VPGM | Read level VRD | Read level VRD |

In Table 2 and this document, when the external input voltage Vext is described as "None" (for example, the operation mode 2, the operation mode 3, the operation mode 4), it indicates that the external input voltage Vext is not applied (not driven) to the pin PIN1. Similarly, when the first driving voltage Vs1 is described as "None," it indicates that the first driving voltage Vs1 is not applied (not driven). When the predetermined signal Vread is described as "None," it indicates that the predetermined signal Vread is not applied (not driven).

As described in Table 2, this document uses V1 to represent the default level, VPGM to represent the write level, VRD to represent the read level, and VS1 to represent the drive level. In this document, high impedance (Hi-Z) indicates that an electronic component or terminal does not receive input signals. Regarding the pin voltage Vpin on the pin PIN1 of the display driving circuit 410 in FIG. 7, in the operation mode 1 of Table 2, the pin voltage Vpin may have the write level VPGM, which may correspond to the level of the external input voltage Vext. In the operation mode 2 of Table 2, the pin voltage Vpin may have the write level VPGM, which may correspond to the level of the first driving voltage Vs1. In the operation mode 3 of Table 2, the state of the pin PIN1 may be high impedance. In the operation mode 4 of Table 2, the pin voltage Vpin may have the drive level VS1, which may correspond to the level of the first driving voltage Vs1.

When the display driving circuit state in Table 2 is "inactive," it indicates that the display driving circuit 410 does not drive the display panel 415. When the display driving circuit state in Table 2 is "active," it indicates that the display driving circuit 410 drives the display panel 415 to perform screen updates.

The following describes each operation mode of the display system 70 in Table 2, with reference to FIG. 4 through FIG. 7.

(1) Operation Mode 1 of Table 2 (External Programming Operation):

The state of the switch circuit 400 may correspond to FIG. 5(A), which may correspond to the first mode of Table 1. For example, this mode may be applicable during the chip probing (CP) stage at the wafer level, when chips have not yet been diced and have not yet been coupled to the display panel 415. The "external programming" at this stage may be programming before chips leave the factory. As shown in FIG. 7, since the second signal terminal T2 of the switch circuit 400 is coupled to the pin PIN1 of the display driving circuit 410, the external input voltage Vext may be applied to the interior of the display driving circuit 410 through the pin PIN1. Specifically, the external input voltage Vext may be set to the write level VPGM, and through the pin PIN1 and the signal path P1, the operation signal Vp may also have the write level VPGM, thereby performing write operations on the memory 460. Therefore, during chip testing (CP), the external input voltage provided by test equipment may be used to program memory in large quantities of chips, without waiting for the startup time of internal voltages in the display driving circuit 410, thus significantly reducing programming time and saving test time.

(2) Operation Mode 2 of Table 2 (Internal Programming Operation):

The state of the switch circuit 400 may correspond to FIG. 5(B), which may correspond to the second mode of Table 1. For example, this mode may be applicable when the display driving circuit 410 has left the factory and is installed in the display system 70. At this time, "internal programming" may be executed at any time according to requirements to update data in the memory 460. As shown in FIG. 7, since the first source driving voltage Vs1 inside the display driving circuit 410 is coupled to the first signal terminal T1 of the switch circuit 400, it may be transmitted to the operation signal Vp through the signal path P21. Meanwhile, since the second signal terminal T2 of the switch circuit 400 is coupled to the pin PIN1 of the display driving circuit 410, the first source driving voltage Vs1 may be transmitted to the pin PIN1 through the signal path P22, where voltage stabilization may be performed by the capacitor C1. Specifically, the first source driving voltage Vs1 provided by the power generator 412 may be set to the write level VPGM, and through the signal path P21, the operation signal Vp may also have the write level VPGM, thereby performing write operations on the memory 460. Since this stage uses voltages generated inside the display driving circuit 410 to perform memory write operations to update data in the memory 460, it may be called "internal programming." It should be noted that during internal programming, the first source driving voltage Vs1 may serve as the write voltage for the memory 460.

(3) Operation Mode 3 of Table 2 (Loading Data of Memory into Lookup Circuit):

The state of the switch circuit 400 may correspond to FIG. 6(A), which may correspond to the fourth mode of Table 1. In the operation mode 3, the predetermined signal Vread may be set to the read level VRD to serve as the read voltage for the memory 460. Through the signal path P4 in FIG. 6(A), the operation signal Vp in FIG. 7 may also have the read level VRD, thereby reading the predetermined data Data from the memory 460 and loading the predetermined data Data into the lookup circuit 470.

As described above, since the operation mode 3 requires a signal path that conducts between the third signal terminal T3 and the fourth signal terminal T4 of the switch circuit 400, in addition to FIG. 6(A), the state of the switch circuit 400 may also be set as shown in FIG. 5(C) and FIG. 6(B) to execute the operation mode 3, which are described separately below.

If the state of the switch circuit 400 corresponds to FIG. 5(C), the predetermined signal Vread may be transmitted through the signal path P31 in FIG. 5(C) to transmit the operation signal Vp to the memory 460. The operation signal Vp may be used to control the memory 460 to load the predetermined data Data into the lookup circuit 470. It should be noted that at this time, through transmission of the signal path P32, the pin voltage Vpin and the first driving voltage Vs1 may be equal. When the first driving voltage Vs1 has the default level V1, the external input voltage Vext may not be applied to avoid signal conflicts.

If the state of the switch circuit 400 corresponds to FIG. 6(B), the predetermined signal Vread may be transmitted through the signal path P52 in FIG. 6(B) to transmit the operation signal Vp to the memory 460. The operation signal Vp may be used to control the memory 460 to load the predetermined data Data into the lookup circuit 470. It should be noted that at this time, through transmission of the signal path P51, the pin voltage Vpin and the predetermined signal Vread may be equal, and the external input voltage Vext may not be applied at this time to avoid signal conflicts.

(4) Operation Mode 4 of Table 2 (Update Display Image of Display Panel):

The state of the switch circuit 400 may correspond to FIG. 5(C), which may correspond to the third mode of Table 1. For example, this mode may be applicable when updating the display panel 415. At this time, data from the memory 460 may be read and loaded into the lookup circuit 470 to generate the lookup result Sr. The source driver 420 may correspondingly select the first source driving voltage Vs1 to the nth source driving voltage Vsn generated by the power generator 412 according to the lookup result Sr, to provide the source driving signals Sout1 to Soutx to the display panel 415, thereby updating the screen of the display panel 415. As shown in FIG. 7, since the predetermined signal Vread inside the display driving circuit 410 is coupled to the third signal terminal T3 of the switch circuit 400, it may be transmitted to the operation signal Vp through the signal path P31.

Meanwhile, since the first signal terminal T1 of the switch circuit 400 is coupled to the first source driving voltage Vs1 and the second signal terminal T2 of the switch circuit 400 is coupled to the pin PIN1 of the display driving circuit 410, the first source driving voltage Vs1 may be transmitted to the pin PIN1 through the signal path P32, where voltage stabilization may be performed by the capacitor C1. Specifically, the predetermined signal Vread may be set to the read level VRD to serve as the read voltage for the memory 460, and through the signal path P31, the operation signal Vp may also have the read level VRD. The first source driving voltage Vs1 may be set to the drive level VS1 to serve as the driving voltage for the display panel 415, and may be transmitted to the capacitor C1 on the pin PIN1 through the signal path P32, so the capacitor C1 performs voltage stabilization for the first source driving voltage Vs1 (that is, the voltage level of the capacitor C1 may be substantially equal to the drive level VS1). It should be noted that in the case of display screen updates, the first source driving voltage Vs1 may serve as the driving voltage for the display panel 415, and two independent signal paths may be formed inside the switch circuit 400: the signal path P32 for connecting the first source driving voltage Vs1 to the capacitor C1 disposed external to the display driving circuit 410 for voltage stabilization, and the signal path P31 for connecting the predetermined signal Vread to the memory 460 for read operations. Since the first source driving voltage Vs1 may supply current to hundreds or more source lines through the source driver 420 for current sinking, with a very large instantaneous load, coupling to the capacitor C1 external to the chip may be needed for voltage stabilization.

The above operation modes 1 to 4 of Table 2 and FIG. 7 may be executed at different time periods. That is, any two of the operation modes 1 to 4 may not be executed simultaneously.

For example, the operation mode 1 may be executed during the chip probing (CP) stage before chips leave the factory. The operation modes 2, 3, and 4 may be executed at different time periods after chips leave the factory.

For example, before chips leave the factory, external programming may be performed during the chip probing (CP) stage through the operation mode 1 to write data to the memory 460. After chips leave the factory, according to actual display screen requirements, internal programming may be executed through the operation mode 2 to change data in the memory 460, and this step may be executed multiple times. When adjusting display content of the display panel 415 (for example, when updating prices on electronic shelves), the operation modes 3 and 4 may be executed sequentially to update display content of the display panel 415. This is only an example, and the execution order of operation modes may not be limited to this and may be dynamically adjusted.

As shown in FIG. 4 through FIG. 7, Table 1, and Table 2, for the display driving circuit 410, in the operation mode 1 of Table 2, the pin PIN1 may be used to receive the external input voltage Vext, thereby executing the "external programming" function. In the operation mode 4 of Table 2, the pin PIN1 may be used to couple to the external capacitor C1 to perform voltage stabilization for the first source driving voltage Vs1, thereby executing the "screen update" function.

Therefore, by providing different signal paths through mode switching of the switch circuit 400, the shared functionality of the pin PIN1 of the display driving circuit 410 is achieved. In other words, a single pin may execute multiple functions in different time periods and operation modes.

If the pin sharing technology demonstrated by the pin PIN1 in FIG. 7 is applied to the pins VSPL1/VMTP1 and VSPL2/VMTP2 mentioned in FIG. 3, the shared functionality of these pins may be achieved.

In other words, the switch circuit 400 of FIG. 4 and the display driving circuit 410 of FIG. 7 may be used to design the display driving circuit 410 of FIG. 2A to achieve the shared functionality of pins.

The operation content of the memory 460 described in Table 2 is only an example. According to embodiments, through mode switching, write operations, read operations, current measurement operations, verification operations, or other operations may be performed on the memory 460.

Figure 8:
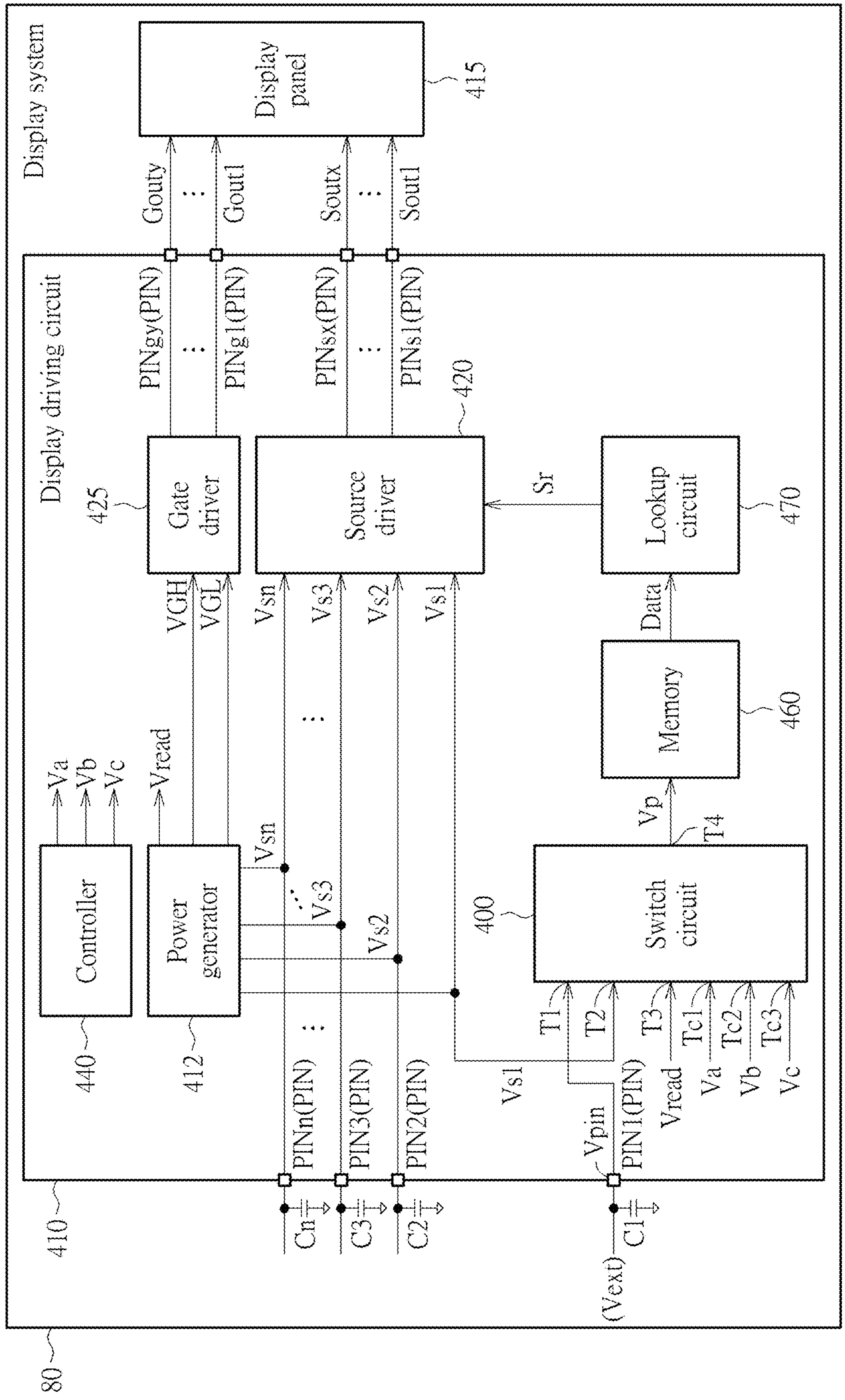
FIG. 8 shows a schematic diagram of a display system according to another embodiment.

FIG. 8 shows a schematic diagram of a display system 80 according to another embodiment. The display system 80 may be similar to the display system 70 of FIG. 7, and similar aspects will not be repeated.

Unlike the display system 70, in the display system 80, the first signal terminal T of the switch circuit 400 is coupled to the pin PIN1, and the second signal terminal T2 is coupled to the power generator 412. Using the coupling method of FIG. 8, the shared functionality of the pin PIN1 of the display driving circuit 410 may also be achieved.

Table 3 below describes circuit operation methods and multiple operation modes of the display system 80. It should be understood that Table 3 is only provided as a specific example to illustrate the content of this case and is not intended as a limitation.

The operation modes 1, 2, 3, and 4 of Table 3 may be executed at different time periods rather than simultaneously.

TABLE 3

| Operation Modes of Display System 80 | Operation Mode 1 | Operation Mode 2 | Operation Mode 3 | Operation Mode 4 |
|---|---|---|---|---|
| Operation Content | Programming Memory 460 by external power | Programming Memory 460 by internal power | Loading data of Memory 460 into Lookup circuit 470 | Update display image of Display panel 415 |
| Display System State | Write to Memory 460 | Write to Memory 460 | Reload Lookup circuit 470 | Refresh Display panel 415 |
| Display Driving Circuit State | Inactive | Inactive | Inactive | Active |
| Memory State | Write | Write | Read | Read |
| States of First Switch Sa, | As shown in FIG.5(B) | As shown in FIG.5(A) | As shown in FIG.6(A) | As shown in FIG.5(C) |

TABLE 3-continued

| Operation Modes of Display System 80 | Operation Mode 1 | Operation Mode 2 | Operation Mode 3 | Operation Mode 4 |
|---|---|---|---|---|
| Second Switch Sb, Third Switch So | | | | |
| First Driving Voltage Vs1 | None | Write level VPGM | None/Default level V1 | Drive level VS1 |
| External Input Voltage Vext | Write level VPGM | None | None | None |
| Predetermined Signal Vread | None/Read level VRD | None/Read level VRD | Read level VRD | Read level VRD |
| Operation Signal Vp | Write level VPGM | Write level VPGM | Read level VRD | Read level VRD |

In Table 3, when the first driving voltage Vs1, the external input voltage Vext, and the predetermined signal Vread are described as "None," it indicates that voltages and signals may not be applied (not driven).

Regarding the pin voltage Vpin on the pin PIN1 of the display driving circuit 410 in FIG. 8, in the operation mode 1 of Table 3, the pin voltage Vpin may have the write level VPGM, which may correspond to the level of the external input voltage Vext. In the operation mode 2 of Table 3, the state of the pin PIN1 may be high impedance. In the operation mode 3 of Table 3, the state of the pin PIN1 may be high impedance. In the operation mode 4 of Table 3, the pin voltage Vpin may have the drive level VS1, which may correspond to the level of the first driving voltage Vs1.

(1) Operation Mode 1 of Table 3 (Programming Memory by External Power):

The state of the switch circuit 400 may correspond to FIG. 5(B). For example, this mode may be applicable during the chip probing (CP) stage at the wafer level, when chips have not yet been diced and have not yet been coupled to the display panel 415. The "external programming" at this stage may be programming before chips leave the factory. As shown in FIG. 8, since the first signal terminal T1 of the switch circuit 400 is coupled to the pin PIN1 of the display driving circuit 410, the external input voltage Vext may be applied to the interior of the display driving circuit 410 through the pin PIN1. Specifically, the external input voltage Vext may be set to the write level VPGM, and through the pin PIN1 and the signal path P21, the operation signal Vp may also have the write level VPGM, thereby performing write operations on the memory 460. Therefore, during chip testing (CP), the external input voltage provided by test equipment may be used to program memory in large quantities of chips, without waiting for the startup time of internal voltages in the display driving circuit 410, thus significantly reducing programming time and saving test time.

(2) Operation Mode 2 of Table 3 (Programming Memory by Internal Power):

The state of the switch circuit 400 may correspond to FIG. 5(A). For example, this mode may be applicable when the display driving circuit 410 has left the factory and is installed in the display system 70. At this time, "internal programming" may be executed at any time according to requirements to update data in the memory 460. As shown in FIG. 8, since the first source driving voltage Vs1 inside the display driving circuit 410 is coupled to the second signal terminal T2 of the switch circuit 400, it may be transmitted to the operation signal Vp through the signal path P1. Specifically, the first source driving voltage Vs1 provided by the power generator 412 may be set to the write level VPGM, and through the signal path P1, the operation signal Vp may also have the write level VPGM, thereby performing write operations on the memory 460. Since this stage uses voltages generated inside the display driving circuit 410 to perform memory write operations to update data in the memory 460, it may be called "internal programming." It should be noted that during internal programming, the first source driving voltage Vs1 may serve as the write voltage for the memory 460.

In addition to FIG. 5(A), the state of the switch circuit 400 may also be as shown in FIG. 6(B). The first source driving voltage Vs1 provided by the power generator 412 may be set to the write level VPGM, and through the signal path P53, the operation signal Vp may also have the write level VPGM, thereby performing "internal programming" on the memory 460. It should be noted that when performing internal programming with the state of the switch circuit 400 as shown in FIG. 6(B), the state of the third signal terminal T3 may be the same as the state of the second signal terminal T2 through transmission of the signal path P51. At this time, signals may not be input from the third signal terminal T3 to avoid signal conflicts.

(3) Operation Mode 3 of Table 3 (Loading Data of Memory into Lookup Circuit):

The state of the switch circuit 400 may correspond to FIG. 6(A). In the operation mode 3, the predetermined signal Vread may be set to the read level VRD to serve as the read voltage for the memory 460. Through the signal path P4 in FIG. 6(A), the operation signal Vp in FIG. 8 may also have the read level VRD, thereby reading the predetermined data Data from the memory 460 and loading the predetermined data Data into the lookup circuit 470.

As described above, since the operation mode 3 requires a signal path that conducts between the third signal terminal T3 and the fourth signal terminal T4 of the switch circuit 400, in addition to FIG. 6(A), the state of the switch circuit 400 may also be set as shown in FIG. 5(C) and FIG. 6(B) to execute the operation mode 3. The following describes each separately.

If the state of the switch circuit 400 corresponds to FIG. 5(C), the predetermined signal Vread may be transmitted through the signal path P31 in FIG. 5(C) to transmit the operation signal Vp to the memory 460. The operation signal Vp may be used to control the memory 460 to load the predetermined data Data into the lookup circuit 470. It should be noted that at this time, the state of the second signal terminal T2 may be high impedance or may have the default level V1. Through transmission of the signal path P32, the states of the first signal terminal T1 and the second signal terminal T2 may be the same. When the second signal terminal T2 has the default level V1, the external input voltage Vext may not be applied to avoid signal conflicts.

If the state of the switch circuit 400 corresponds to FIG. 6(B), the predetermined signal Vread may be transmitted through the signal path P52 in FIG. 6(B) to transmit the operation signal Vp to the memory 460. The operation signal Vp may be used to control the memory 460 to load the predetermined data Data into the lookup circuit 470. It should be noted that at this time, the first driving voltage Vs1 may not be input to the second signal terminal T2 to avoid signal conflicts.

(4) Operation Mode 4 of Table 3 (Update Display Image of Display Panel):

The state of the switch circuit 400 may correspond to FIG. 5(C). For example, this mode may be applicable when updating the display panel 415. At this time, data from the memory 460 may be read and loaded into the lookup circuit 470 to generate the lookup result Sr. The source driver 420 may correspondingly select the first source driving voltage Vs1 to the nth source driving voltage Vsn generated by the power generator 412 according to the lookup result Sr, to provide the source driving signals Sout1 to Soutx to the display panel 415, thereby updating the screen of the display panel 415. As shown in FIG. 8, since the predetermined signal Vread inside the display driving circuit 410 is coupled to the third signal terminal T3 of the switch circuit 400, the predetermined signal Vread may be transmitted through the signal path P31 to generate the operation signal Vp. Meanwhile, since the second signal terminal T2 of the switch circuit 400 is coupled to the first source driving voltage Vs1 and the first signal terminal T1 of the switch circuit 400 is coupled to the pin PIN1 of the display driving circuit 410, the first source driving voltage Vs1 may be transmitted to the pin PIN1 through the signal path P32, where voltage stabilization may be performed by the capacitor C1. Specifically, the predetermined signal Vread may be set to the read level VRD to serve as the read voltage for the memory 460, and through the signal path P31, the operation signal Vp may also have the read level VRD. The first source driving voltage Vs1 may be set to the drive level VS1 to serve as the driving voltage for the display panel 415, and may be transmitted to the capacitor C1 on the pin PIN1 through the signal path P32, so the capacitor C1 performs voltage stabilization for the first source driving voltage Vs1 (that is, the voltage level of the capacitor C1 may be substantially equal to the drive level VS1). It should be noted that in the case of display screen updates, the first source driving voltage Vs1 may serve as the driving voltage for the display panel 415, and two independent signal paths may be formed inside the switch circuit 400: the signal path P32 for connecting the first source driving voltage Vs1 to the capacitor C1 disposed external to the display driving circuit 410 for voltage stabilization, and the signal path P31 for connecting the predetermined signal Vread to the memory 460 for read operations. Since the first source driving voltage Vs1 may supply current to hundreds or more source lines for current sinking, with a very large instantaneous load, coupling to the capacitor C1 external to the chip may be needed for voltage stabilization.

The above Tables 1 through 3, FIG. 7, FIG. 8, and related descriptions may disclose relevant operation methods of the switch circuit 400. Through the switch circuit 400, sharing of the pin PIN1 may be achieved.

The above FIG. 7 and FIG. 8 may use the switch circuit 400 disposed in the display driving circuit 410 as examples. However, embodiments may not be limited thereto, and the switch circuit 400 may also be applied in electronic circuits for other purposes. The following provides other embodiments.

Figure 9:
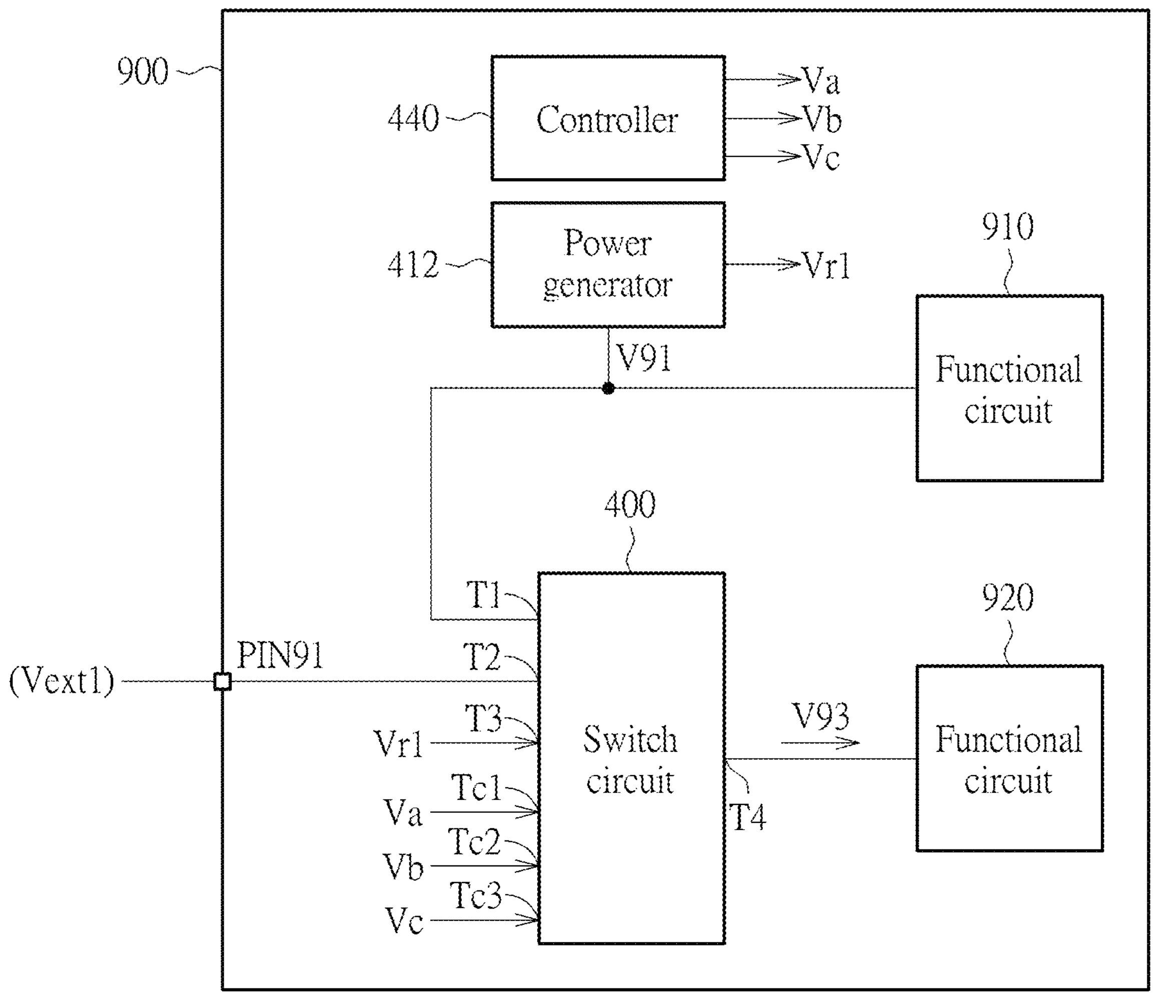
FIG. 9 shows a schematic diagram of an integrated circuit according to another embodiment.

FIG. 9 shows a schematic diagram of an integrated circuit 900 according to another embodiment. The integrated circuit 900 may be any integrated circuit, including but not limited to Application-Specific Integrated Circuits (ASICs), processors, microcontrollers (MCUs), digital signal processors (DSPs), driver integrated circuits, power management integrated circuits (PMICs), radio frequency integrated circuits (RFICs), and integrated circuits for any purpose. The switch circuit 400 may be used to implement the shared functionality of a pin PIN91 of the integrated circuit 900. Similar aspects between the integrated circuit 900 and FIG. 7 and FIG. 8 may not be repeated. The operation modes of the integrated circuit 900 will now be described in the subsequent paragraphs.

(1) External Control Mode of Integrated Circuit 900:

Referring to FIG. 9 and FIG. 5(A), the switch states of the switch circuit 400 in FIG. 9 may be set as shown in FIG. 5(A), applying an external signal Vext1 to the pin PIN91. The external signal Vext1 may be transmitted through the signal path P1 in FIG. 5(A), and the switch circuit 400 may output a signal V93 to a functional circuit 920 to control the functional circuit 920. Thereby, external operations may be achieved through the pin PIN91. For example, external operations may include but may not be limited to the aforementioned external programming.

(2) Internal Control Mode of Integrated Circuit 900:

Referring to FIG. 9 and FIG. 5(B), if the switch states of the switch circuit 400 in FIG. 9 are set as shown in FIG. 5(B), the first signal terminal T1 may receive a signal V91, and the signal V91 may be transmitted to the fourth signal terminal T4 through the signal path P21 in FIG. 5(B). The switch circuit 400 may output the signal V93 to the functional circuit 920 to control the functional circuit 920. The signal V91 may also be transmitted to a functional circuit 910 for other control. In this mode, the signal V91 may also be transmitted to the second signal terminal T2 through the signal path P22 in FIG. 5(B), and since the second signal terminal T2 of the switch circuit 400 in FIG. 9 is coupled to the pin PIN91 of the integrated circuit 900, the signal V91 may be transmitted to the exterior of the integrated circuit 900. For example, if the pin PIN91 is externally connected to a capacitor, the signal V91 may undergo voltage stabilization by the capacitor coupled to the pin PIN91. In other embodiments, the pin PIN91 may be externally connected to resistors, inductors, or other electronic components, enabling the signal V91 to be transmitted to components coupled to the pin PIN91 for required operations. Thereby, the integrated circuit 900 may execute internal operations and transmit the signal V91 through the pin PIN91. For example, internal operations may include but may not be limited to the aforementioned internal programming. It should be noted that typically, the external signal Vext1 may not be applied to the pin PIN91 at this time to avoid signal conflicts.

Additionally, referring to FIG. 9 and FIG. 5(C), if the switch states of the switch circuit 400 in FIG. 9 are set as shown in FIG. 5(C), a predetermined signal Vr1 may be transmitted through the third signal terminal T3, the signal path P31, and the fourth signal terminal T4, thereby transmitting the signal V93 to the functional circuit 920 to control the functional circuit 920 and execute internal operations of the integrated circuit 900. Meanwhile, the signal V91 may be transmitted to the second signal terminal T2 through the signal path P32 in FIG. 5(C), enabling the signal V91 to be transmitted to the pin PIN91 for predetermined operations (for example, but not limited to voltage stabilization). It should be noted that typically, the external signal Vext1 may not be applied to the pin PIN91 at this time to avoid signal conflicts.

Through other modes of the switch circuit 400, in the integrated circuit 900, the third signal terminal T3 may transmit the predetermined signal Vr1 to the fourth signal terminal T4 for other operations of the functional circuit 920.

In FIG. 9, the first signal terminal T1 of the switch circuit 400 is coupled to the power generator 412, and the second signal terminal T2 is coupled to the pin PIN91, but embodiments may not be limited thereto. In another embodiment, the second signal terminal T2 of the switch circuit 400 may be coupled to the power generator 412, and the first signal terminal T1 may be coupled to the pin PIN91 (similar to the coupling method in FIG. 8), to achieve sharing of the pin PIN91.

Figure 10:
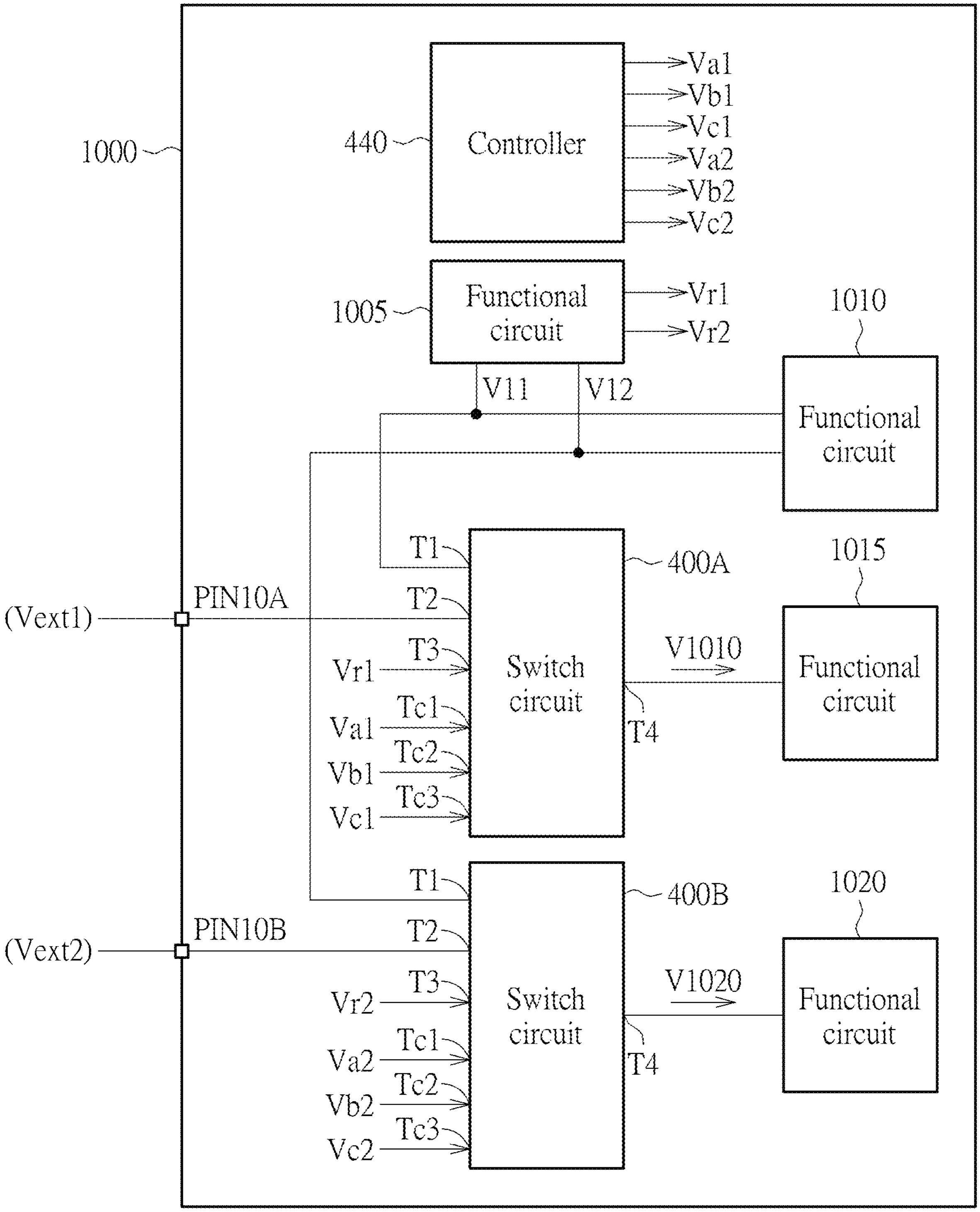
FIG. 10 shows a schematic diagram of an integrated circuit according to another embodiment.

In FIG. 9, one switch circuit 400 is used. According to other embodiments, by using multiple switch circuits 400, shared functionality of multiple pins may be achieved. FIG. 10 shows a schematic diagram of an integrated circuit 1000 according to another embodiment. Similar aspects between the integrated circuit 1000 and FIG. 9 may not be described in detail. The integrated circuit 1000 may include two switch circuits 400A and 400B. The architecture of each of the switch circuits 400A and 400B may be the same as the switch circuit 400.

(1) Regarding Switch Circuit 400A and Pin PIN10A in FIG. 10:

The switch circuit 400A may be coupled to the pin PIN10A to implement the shared functionality of the pin PIN10A.

In the external control mode, the switch states of the switch circuit 400A may be set as shown in FIG. 5(A). Through the pin PIN10A, the external signal Vext1 may be transmitted to the switch circuit 400A, and the switch circuit 400A may be used to transmit the external signal Vext1 to transmit a signal V1010 to a functional circuit 1015, thereby performing external control on the functional circuit 1015.

In the internal control mode, the switch states of the switch circuit 400A may be set as shown in FIG. 5(B) or FIG. 5(C). The following describes each separately.

If the switch circuit 400A in FIG. 10 is set as shown in FIG. 5(B), a functional circuit 1005 may transmit an internal signal V11 to the first signal terminal T1 of the switch circuit 400A, and transmit the internal signal V11 to the fourth signal terminal T4 through the signal path P21 in FIG. 5(B), to transmit the signal V1010 to the functional circuit 1015 for internal control of the functional circuit 1015.

If the switch circuit 400A in FIG. 10 is set as shown in FIG. 5(C), the predetermined signal Vr1 may be transmitted to the third signal terminal T3 of the switch circuit 400A, and transmit the predetermined signal Vr1 to the fourth signal terminal T4 through the signal path P31 in FIG. 5(C), to transmit the signal V1010 to the functional circuit 1015 for internal control of the functional circuit 1015.

Meanwhile, through the first signal terminal T1 of the switch circuit 400A, the signal path between the first signal terminal T1 and the second signal terminal T2 (for example, the signal path P22 in FIG. 5(B), the signal path P32 in FIG. 5(C)), and the pin PIN10A, components coupled to the pin PIN10A (for example, capacitors, inductors, resistors, or appropriate components) may be used to perform predetermined operations on the internal signal V11, such as voltage stabilization or other operations.

(2) Regarding Switch Circuit 400B and Pin PIN10B in FIG. 10:

Similar to the switch circuit 400A, the switch circuit 400B may be coupled to the pin PIN10B to implement the shared functionality of the pin PIN10B.

In the external control mode, the switch states of the switch circuit 400B may be set as shown in FIG. 5(A). Through the pin PIN10B, an external signal Vext2 may be transmitted to the switch circuit 400B, and the switch circuit 400B may be used to transmit the external signal Vext2 to transmit a signal V1020 to a functional circuit 1020, thereby performing external control on the functional circuit 1020.

In the internal control mode, the switch states of the switch circuit 400B may be set as shown in FIG. 5(B) or FIG. 5(C). The following describes each separately.

If the switch circuit 400B in FIG. 10 is set as shown in FIG. 5(B), the functional circuit 1005 may transmit an internal signal V12 to the first signal terminal T1 of the switch circuit 400B, and transmit the internal signal V12 to the fourth signal terminal T4 through the signal path P21 in FIG. 5(B), to transmit the signal V1020 to the functional circuit 1020 for internal control of the functional circuit 1020.

If the switch circuit 400B in FIG. 10 is set as shown in FIG. 5(C), a predetermined signal Vr2 may be transmitted to the third signal terminal T3 of the switch circuit 400B, and transmit the predetermined signal Vr2 to the fourth signal terminal T4 through the signal path P31 in FIG. 5(C), to transmit the signal V1020 to the functional circuit 1020 for internal control of the functional circuit 1020.

Meanwhile, through the first signal terminal T1 of the switch circuit 400B, the signal path between the first signal terminal T1 and the second signal terminal T2 (for example, the signal path P22 in FIG. 5(B), the signal path P32 in FIG. 5(C)), and the pin PIN10B, components coupled to the pin PIN10B (for example, capacitors, inductors, resistors, or appropriate components) may be used to perform predetermined operations on the internal signal V12, such as voltage stabilization or other operations.

In FIG. 10, the integrated circuit 1000 may include the switch circuit 400A and the switch circuit 400B. This may represent an embodiment where two switch circuits 400 from FIG. 4 are used in the integrated circuit 1000, thereby implementing shared functionality of two pins (the pin PIN10A and the pin PIN10B). However, embodiments may not be limited thereto. If more switch circuits 400 are used within the integrated circuit, shared functionality of more pins may be achieved. For example, if m switch circuits 400 are used, shared functionality of m pins may be achieved, where m may be an integer greater than or equal to 1.

The coupling method between switch circuits and pins may not be limited to that shown in FIG. 10. In FIG. 10, each of the switch circuits 400A and 400B has its first signal terminal T1 coupled to functional circuits inside the integrated circuit 1000, and its second signal terminal T2 coupled to pins. However, embodiments may not be limited thereto. The coupling method of switch circuits may reasonably vary while still falling within the scope of embodiments. When using multiple switch circuits, at least one switch circuit may have its first signal terminal T1 coupled to pins of the integrated circuit, and its second signal terminal T2 coupled to functional circuits inside the integrated circuit (similar to the coupling method of the switch circuit 400 in FIG. 8). This coupling method also may fall within the scope of embodiments. Taking FIG. 10 as an example, if the coupling method of the switch circuit 400B is adjusted such that the first signal terminal T1 of the switch circuit 400B is changed to be coupled to the pin PIN10B, and the second signal terminal T2 of the switch circuit 400B is changed to be coupled to the functional circuit 1005, this still may fall within the scope of embodiments.

Although electronic paper displays are used as examples above, applications of embodiments may not be limited thereto. Other types of displays, such as Liquid Crystal Displays (LCDs), Organic Light-Emitting Diode displays (OLEDs), Quantum Dot Light-Emitting Diode displays (QLEDs), Micro Light-Emitting Diode displays (Micro-LEDs), Field Emission Displays (FEDs), Plasma Display Panels (PDPs), Surface-Conduction Electron-Emitter Displays (SEDs), Electrowetting Displays, Interferometric Modulator Displays (IMODs), Electrochromic Displays, and others, may also benefit from the solutions provided by embodiments.

In summary, the solutions provided by these embodiments may achieve pin sharing. The solutions of embodiments may be widely applied to various electronic devices that may require pin sharing functionality. By flexibly utilizing various modes of the switch circuit 400 to provide different signal paths, compatibility issues between integrated circuits and circuit boards are resolved when the display driving circuit 410 operates with a limited number of pins. Therefore, these solutions provide significant benefits for addressing technical challenges in the electronics field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display driving circuit comprising:

a plurality of pins, wherein each pin is a hardware interface between internal and external of the display driving circuit, the plurality of pins comprising a first pin to an nth pin and at least one source driving pin;

a power generator comprising a first output terminal to an nth output terminal, configured to respectively provide a first source driving voltage to an nth source driving voltage;

a source driver comprising a first input terminal to an nth input terminal, respectively coupled to the first output terminal to the nth output terminal of the power generator, and at least one output terminal, the at least one output terminal respectively coupled to the at least one source driving pin, configured to output at least one source driving signal; and a first switch circuit comprising a first signal terminal, a second signal terminal, a third signal terminal, and a fourth signal terminal, wherein one of the first signal terminal and the second signal terminal is coupled to the first output terminal of the power generator, and the other one of the first signal terminal and the second signal terminal is coupled to the first pin;

wherein n is an integer greater than or equal to 1.

2. The display driving circuit of claim 1, wherein the first switch circuit further comprises:

a first switch comprising a first terminal, a second terminal, and a control terminal;

a second switch comprising a first terminal, a second terminal, and a control terminal;

a third switch comprising a first terminal, a second terminal, and a control terminal;

a first control terminal coupled to the control terminal of the first switch, configured to receive a first control signal, the first control signal configured to turn on or turn off the first switch;

a second control terminal coupled to the control terminal of the second switch, configured to receive a second control signal, the second control signal configured to turn on or turn off the second switch; and a third control terminal coupled to the control terminal of the third switch, configured to receive a third control signal, the third control signal configured to turn on or turn off the third switch;

wherein the first signal terminal is coupled to the first terminal of the first switch;

the second signal terminal is coupled to the second terminal of the first switch and the first terminal of the second switch;

the third signal terminal is coupled to the first terminal of the third switch; and the fourth signal terminal is coupled to the second terminal of the second switch and the second terminal of the third switch.

3. A circuit operation method configured to control the display driving circuit of claim 2, the circuit operation method comprising:

in a third mode, the first switch is turned on, the second switch is turned off, the third switch is turned on, a third signal path is formed between the third signal terminal and the fourth signal terminal through the third switch, and a fourth signal path is formed between the first signal terminal and the second signal terminal through the first switch.

4. The circuit operation method of claim 3, further comprising:

in a first mode, the first switch is turned off, the second switch is turned on, the third switch is turned off, and a first signal path is formed between the second signal terminal and the fourth signal terminal through the second switch.

5. The circuit operation method of claim 4, further comprising:

in a second mode, the first switch is turned on, the second switch is turned on, the third switch is turned off, and a second signal path is formed between the first signal terminal and the fourth signal terminal through the first switch and the second switch;

in a fourth mode, the first switch is turned off, the second switch is turned off, the third switch is turned on, and a fifth signal path is formed between the third signal terminal and the fourth signal terminal through the third switch;

in a fifth mode, the first switch is turned off, the second switch is turned on, the third switch is turned on, a sixth signal path is formed between the third signal terminal and the second signal terminal through the second switch and the third switch, and a seventh signal path is formed between the third signal terminal and the fourth signal terminal through the third switch; and in a sixth mode, the first switch is turned on, the second switch is turned off, the third switch is turned off, and an eighth signal path is formed between the first signal terminal and the second signal terminal through the first switch.

6. The circuit operation method of claim 3, further comprising:

in a second mode, the first switch is turned on, the second switch is turned on, the third switch is turned off, and a second signal path is formed between the first signal terminal and the fourth signal terminal through the first switch and the second switch.

7. The circuit operation method of claim 6, further comprising:

in a first mode, the first switch is turned off, the second switch is turned on, the third switch is turned off, and a first signal path is formed between the second signal terminal and the fourth signal terminal through the second switch;

in a fourth mode, the first switch is turned off, the second switch is turned off, the third switch is turned on, and a fifth signal path is formed between the third signal terminal and the fourth signal terminal through the third switch;

in a fifth mode, the first switch is turned off, the second switch is turned on, the third switch is turned on, a sixth signal path is formed between the third signal terminal and the second signal terminal through the second switch and the third switch, and a seventh signal path is formed between the third signal terminal and the fourth signal terminal through the third switch; and in a sixth mode, the first switch is turned on, the second switch is turned off, the third switch is turned off, and an eighth signal path is formed between the first signal terminal and the second signal terminal through the first switch.

8. A display system comprising:

the display driving circuit of claim 1, and a display;

wherein the plurality of pins of the display driving circuit further comprises at least one gate driving pin;

the display driving circuit further comprises a gate driver, the gate driver comprising at least one input terminal configured to receive at least one gate driving voltage, and at least one output terminal respectively coupled to the at least one gate driving pin, configured to respectively output at least one gate driving signal; and the display comprises a plurality of input terminals respectively coupled to the at least one source driving pin and the at least one gate driving pin of the display driving circuit, the display configured to display a display image according to at least the at least one source driving signal and the at least one gate driving signal.

9. The display system of claim 8, wherein the display comprises a member selected from a group consisting of an Electrophoretic Display (EPD), a Liquid Crystal Display (LCD), an Organic Light-Emitting Diode display (OLED), a Quantum Dot Light-Emitting Diode display (QLED), a Micro Light-Emitting Diode display (Micro-LED), a Field Emission Display (FED), a Plasma Display Panel (PDP), a Surface-Conduction Electron-Emitter Display (SED), an Electrowetting Display, an Interferometric Modulator Display (IMOD), and an Electrochromic Display.

10. The display driving circuit of claim 1, further comprising:

a memory comprising an input terminal coupled to the fourth signal terminal of the first switch circuit, and an output terminal configured to output predetermined data; and a lookup circuit comprising an input terminal configured to receive the predetermined data, and at least one output terminal configured to output a lookup result;

wherein the source driver further comprises at least one data input terminal coupled to the at least one output terminal of the lookup circuit, and the source driver outputs the at least one source driving signal according to at least the lookup result.

11. The display driving circuit of claim 1, wherein the plurality of pins further comprises at least one gate driving pin, and the display driving circuit further comprises:

a gate driver comprising at least one input terminal configured to receive at least one gate driving voltage, and at least one output terminal respectively coupled to the at least one gate driving pin, configured to respectively output at least one gate driving signal.

12. The display driving circuit of claim 1, wherein:

the second output terminal to the nth output terminal of the power generator are respectively coupled to the second pin to the nth pin, and the first pin to the nth pin are respectively coupled to a first capacitor to an nth capacitor, and the first capacitor to the nth capacitor are disposed external to the display driving circuit.

13. The display driving circuit of claim 1, further comprising:

a second switch circuit comprising a first signal terminal, a second signal terminal, a third signal terminal, and a fourth signal terminal, wherein one of the first signal terminal and the second signal terminal of the second switch circuit is coupled to the second output terminal of the power generator, and the other one of the first signal terminal and the second signal terminal of the second switch circuit is coupled to the second pin.

14. A switch circuit comprising:

a first switch comprising a first terminal, a second terminal, and a control terminal;

a second switch comprising a first terminal, a second terminal, and a control terminal;

a third switch comprising a first terminal, a second terminal, and a control terminal;

a first signal terminal coupled to the first terminal of the first switch;

a second signal terminal coupled to the second terminal of the first switch and the first terminal of the second switch;

a third signal terminal coupled to the first terminal of the third switch;

a fourth signal terminal coupled to the second terminal of the second switch and the second terminal of the third switch;

a first control terminal coupled to the control terminal of the first switch, configured to receive a first control signal, the first control signal configured to turn on or turn off the first switch;

a second control terminal coupled to the control terminal of the second switch, configured to receive a second control signal, the second control signal configured to turn on or turn off the second switch; and a third control terminal coupled to the control terminal of the third switch, configured to receive a third control signal, the third control signal configured to turn on or turn off the third switch;

wherein in a first mode, the first switch is turned off, the second switch is turned on, the third switch is turned off, and a first signal path is formed between the second signal terminal and the fourth signal terminal through the second switch; and wherein in a third mode, the first switch is turned on, the second switch is turned off, the third switch is turned on, a third signal path is formed between the third signal terminal and the fourth signal terminal through the third switch, and a fourth signal path is formed between the first signal terminal and the second signal terminal through the first switch.

15. The switch circuit of claim 14, wherein in a sixth mode, the first switch is turned on, the second switch is turned off, the third switch is turned off, and an eighth signal path is formed between the first signal terminal and the second signal terminal through the first switch.

16. The switch circuit of claim 15, wherein in a fourth mode, the first switch is turned off, the second switch is turned off, the third switch is turned on, and a fifth signal path is formed between the third signal terminal and the fourth signal terminal through the third switch; and wherein in a fifth mode, the first switch is turned off, the second switch is turned on, the third switch is turned on, a sixth signal path is formed between the third signal terminal and the second signal terminal through the second switch and the third switch, and a seventh signal path is formed between the third signal terminal and the fourth signal terminal through the third switch.

17. The switch circuit of claim 14, wherein in a second mode, the first switch is turned on, the second switch is turned on, the third switch is turned off, and a second signal path is formed between the first signal terminal and the fourth signal terminal through the first switch and the second switch.

18. The switch circuit of claim 14, wherein in a fourth mode, the first switch is turned off, the second switch is turned off, the third switch is turned on, and a fifth signal path is formed between the third signal terminal and the fourth signal terminal through the third switch.

19. The switch circuit operation of claim 14, wherein in a fifth mode, the first switch is turned off, the second switch is turned on, the third switch is turned on, a sixth signal path is formed between the third signal terminal and the second signal terminal through the second switch and the third switch, and a seventh signal path is formed between the third signal terminal and the fourth signal terminal through the third switch.

20. The switch circuit of claim 14, wherein each of the first switch, second switch, and third switch comprises a member selected from a group consisting of a Metal-Oxide-Semiconductor Field-Effect Transistor (MOSFET), a Bipolar Junction Transistor (BJT), an Insulated Gate Bipolar Transistor (IGBT), a Silicon Controlled Rectifier (SCR), a Gate Turn-Off Thyristor (GTO), a Complementary Metal-Oxide-Semiconductor (CMOS) switch, a Junction Field-Effect Transistor (JFET), a High Electron Mobility Transistor (HEMT), a Static Induction Transistor (SIT), a Two-Dimensional Electron Gas Field-Effect Transistor (2DEG FET), a Silicon Carbide based power device, a Gallium Nitride based power device, and a Micro-Electro-Mechanical Systems (MEMS) switch.

* * * * *